(12) United States Patent
Lanham et al.

(10) Patent No.: US 11,791,867 B2
(45) Date of Patent: *Oct. 17, 2023

(54) SPACE-TIME ENCODING IN WIRELESS COMMUNICATION SYSTEMS

(71) Applicant: Board of Regents, The University of Texas System, Austin, TX (US)

(72) Inventors: S. Andrew Lanham, Austin, TX (US);
Travis Cuvelier, Austin, TX (US);
Brian R. La Cour, Austin, TX (US);
Robert Heath, Raleigh, NC (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/565,286

(22) Filed: Dec. 29, 2021

(65) Prior Publication Data
US 2022/0123792 A1  Apr. 21, 2022

Related U.S. Application Data

(63) Continuation of application No. 17/124,019, filed on Dec. 16, 2020, now Pat. No. 11,218,195.
(Continued)

(51) Int. Cl.
*H04B 7/04* (2017.01)
*H04B 7/0413* (2017.01)
(Continued)

(52) U.S. Cl.
CPC .......... *H04B 7/0413* (2013.01); *H04L 5/0014* (2013.01); *H04W 72/046* (2013.01); *H04W 72/0466* (2013.01)

(58) Field of Classification Search
CPC . H04B 7/0413; H04B 7/0669; H04W 72/046; H04W 72/0466; H04L 5/0014; H04L 1/06
See application file for complete search history.

(56) References Cited

U.S. PATENT DOCUMENTS 6,185,248 B1 2/2001 Wiegand
7,599,444 B2 10/2009 Ashikhmin
(Continued)

OTHER PUBLICATIONS

A. Ashikhmin and R. Calderbank. Grassmannian packings from operator Reed-Muller codes. IEEE Transactions on Information Theory, 56(11):5689-5714, 2010.
(Continued)

*Primary Examiner* — Dac V Ha
(74) *Attorney, Agent, or Firm* — Meunier Carlin & Curfman LLC

(57) ABSTRACT

A disclosed transmitter for wireless communication includes multiple transmitting antennas, a symbol mapper for mapping an input block including multiple binary bits and representing information to be transmitted to a symbol representing an ordered plurality of complex numbers, a space-time encoder for applying an encoding operator to the symbol to produce a vectorized space-time codeword defining electrical signals to be transmitted by the transmitter, the encoding operator being dependent on a set of predefined stabilizer generators, and circuitry to collectively transmit, by the antennas to multiple receiving antennas of a receiver over a wireless transmission channel, the electrical signals defined by the vectorized space-time codeword. The receiver includes a space-time decoder for recovering the symbol from the electrical signals transmitted by the transmitter using a decoding operation that is based on maximum likelihood inference, and a symbol de-mapper for recovering the input block from the symbol.

20 Claims, 9 Drawing Sheets

Related U.S. Application Data

(60) Provisional application No. 62/948,974, filed on Dec. 17, 2019.

(51) Int. Cl.
*H04W 72/044* (2023.01)
*H04L 5/00* (2006.01)

(56) References Cited

U.S. PATENT DOCUMENTS

| | | |
|---|---|---|
| 2004/0179467 A1 | 9/2004 | Seeger et al. |
| 2011/0238378 A1* | 9/2011 | Allen ............... G06N 10/00 702/186 |
| 2017/0078000 A1* | 3/2017 | Murakami ............ H04L 27/36 |
| 2018/0269972 A1 | 9/2018 | Djordjevic et al. |
| 2021/0021307 A1 | 1/2021 | Shattil |
| 2021/0232963 A1* | 7/2021 | Gimeno-Segovia ... G06N 10/00 |

OTHER PUBLICATIONS

A. Ashikhmin and R. Calderbank. Space-time Reed-Muller codes for noncoherent MIMO transmission. In Proceedings of the International Symposium on Information Theory, pp. 1952-1956. IEEE, 2005.
B. Hochwald and T. Marzetta. Unitary space-time modulation for multiple-antenna communications in Rayleigh flat fading. IEEE Transactions on Information Theory, 46(2):543-564, 2000.
B. Hochwald, T. Marzetta, W. Sweldens T. Richardson, and R. Urbanke. Systematic design of unitary space-time constellations. IEEE Transactions on Information Theory, 46(6): 1962-1973, 2000.
D. Gottesman, "Stabilizer codes and quantum error correction," Ph.D. dissertation, The California Institute of Technology, 1997.
L. Zheng and D. Tse. Communication on the Grassmann manifold: A geometric approach to the noncoherent multiple-antenna channel. IEEE Transactions on Information Theory, 48(2):359-383, 2002.
Lanham, S. Andrew, et al., "A noncoherent space-time code from quantum error correction." 2019 53rd Annual Conference on Information Sciences and Systems (CISS). IEEE, 2019.
M.A. Nielsen and I.L. Chuang, Quantum Computation and Quantum Information. Cambridge University Press, 2017 (8 pages).

* cited by examiner

SPACE-TIME ENCODING IN WIRELESS COMMUNICATION SYSTEMS

RELATED APPLICATIONS

This application is a continuation of U.S. patent application Ser. No. 17/124,019 filed Dec. 16, 2020, entitled "SPACE-TIME ENCODING IN WIRELESS COMMUNICATION SYSTEMS," and claims benefit of U.S. Provisional Application No. 62/948,974 filed Dec. 17, 2019, entitled "SPACE-TIME ENCODING IN WIRELESS COMMUNICATION SYSTEMS," which is incorporated herein by reference in its entirety.

STATEMENT OF GOVERNMENT INTEREST

This invention was made with government support under Grant no. N00014-17-1-2107 awarded by the Office of Naval Research. The government has certain rights in the invention.

FIELD OF THE DISCLOSURE

The present disclosure relates generally to the field of wireless communication systems and more particularly, to systems and methods for space-time encoding of information to be transmitted over a wireless communication channel.

DESCRIPTION OF THE RELATED ART

The fifth-generation (5G) cellular standard, like its predecessors, promises significant improvements to broadband data rates. The full objectives of 5G, however, also demand support for a variety of novel communication scenarios not directly pertinent to the enhancement of mobile broadband. Specifically, ultra-reliable low-latency communication (URLLC) is a 5G effort aimed at providing support for "mission-critical" communication, characterized by requirements for low throughput communication with especially small error rates (e.g., $10^{-9}$ block error probability) and short latencies (e.g., 1 millisecond end-to-end). Similarly, massive machine-to-machine (MM2M) type communication is a 5G effort entailing support for highly dense networks of wireless devices communicating at low-to-moderate data rates. Developing reliable communication in these paradigms remains crucial to the continued development of emerging industries such as autonomous vehicles and industrial automation networks.

URLLC and MM2M system design efforts demand especially stringent constraints on the packet size and the block error probability, in particular. Code design in this regime has been aided by the development of information-theoretic tools analyzing communication at finite blocklengths. Such tools provide insight into the ultimate performance limits of communication networks operating outside the "asymptotic region" of blocklength in a manner that asymptotic information-theoretic analyses could not.

In a departure from communication system designs with very long blocklengths, which overwhelmingly favor spatial multiplexing approaches as a means of improving spectral efficiency, analyses in blocklength-constrained settings reveal a significant rate penalty arising from a limited blocklength. Spatial degrees of freedom in the form of multiple antennas, therefore, are no longer necessary in order to operate near the channel capacity but can still be directed toward reducing the block error probability. This invites a reconsideration of the diversity-multiplexing tradeoff in the constrained multiantenna setting, which has been previously characterized in the high-SNR setting.

Noncoherent communication may be characterized by a lack of channel knowledge at both the transmitter and the receiver, or by the fact that it does not require an explicit estimate of the propagation channel at the receiver. This scenario is assumed when the propagation channel changes rapidly, or with frequency hopping waveforms, where the training required for coherent communication takes too much overhead to be practical.

SUMMARY

This disclosure relates to systems, methods, and apparatus for space-time encoding in wireless communication systems. In one aspect, a disclosed transmitter for wireless communication includes a first plurality of antennas, a symbol mapper configured to map an input block of an incoming binary bit stream representing information to be transmitted to a symbol representing an ordered plurality of complex numbers, the input block comprising a plurality of binary bits, a space-time encoder configured to apply an encoding operator to the symbol to produce a vectorized space-time codeword defining electrical signals to be transmitted by the transmitter, the encoding operator being dependent on a plurality of predefined stabilizer generators, and circuitry to collectively transmit, by the first plurality of antennas to a second plurality of antennas of a receiver over a wireless transmission channel, the electrical signals defined by the vectorized space-time codeword.

In another aspect, a disclosed method for transmitting information in a wireless communication system includes receiving an incoming binary bit stream representing the information, and for each input block of the incoming binary bit stream comprising a predefined number of binary bits, mapping the input block to a respective symbol representing an ordered plurality of complex numbers, applying an encoding operator to the respective symbol to produce a respective vectorized space-time codeword defining electrical signals to be transmitted, the encoding operator being dependent on a plurality of predefined stabilizer generators, and transmitting, collectively and by a first plurality of antennas of a transmitter to a second plurality of antennas of a receiver over a wireless transmission channel, the electrical signals defined by the vectorized space-time codeword.

In yet another aspect, a disclosed system for multiple-input multiple-output (MIMO) transmission includes a transmitter including a first plurality of antennas and a receiver including a second plurality of antennas. The transmitter further includes a symbol mapper configured to map an input block of an incoming binary bit stream representing information to be transmitted to a symbol representing an ordered pair of complex numbers, the input block comprising a plurality of binary bits, a space-time encoder configured to apply an encoding operator to the symbol to produce a vectorized space-time codeword defining electrical signals to be transmitted by the transmitter, the encoding operator being dependent on a plurality of predefined stabilizer generators, and circuitry to collectively transmit, by the first plurality of antennas of the transmitter to the second plurality of antennas of the receiver over a wireless transmission channel, the electrical signals defined by the vectorized space-time codeword.

In any of the disclosed embodiments, the receiver may include a space-time decoder configured to recover the symbol from the electrical signals transmitted by the transmitter using a decoding operation that is based on maximum likelihood inference, and a symbol de-mapper configured to recover the input block from the symbol. The receiver may also include circuitry to collectively receive, by the second plurality of antennas of the receiver from the first plurality of antennas of the transmitter over the wireless transmission channel, the electrical signals defined by the vectorized space-time codewords.

In any of the disclosed embodiments, the wireless transmission channel may be a noncoherent multiple-input multiple-output (MIMO) channel characterized by an unknown channel matrix and may be assumed to have coherence over a predefined time period and additive Gaussian noise.

In any of the disclosed embodiments, the number of antennas in the first plurality of antennas and the number of antennas in the second plurality of antennas may be the same.

In any of the disclosed embodiments, the number of antennas in each of the first plurality of antennas and the second plurality of antennas may be equal to a power of two.

In any of the disclosed embodiments, the number of antennas in each of the first plurality of antennas and the second plurality of antennas may be two.

In any of the disclosed embodiments, the symbol may represent an ordered pair of complex numbers.

In any of the disclosed embodiments, each stabilizer generator S having an index value l of the plurality of predefined stabilizer generators is defined as follows:

$$S_l = X \otimes I_{2^{\lfloor \frac{l}{2} \rfloor}} \otimes Z \otimes I_{2^{k-1}} \otimes Z \otimes I_{2^{k-1-\lfloor \frac{l}{2} \rfloor}}$$

when l is even, $$X = \begin{pmatrix} 0 & 1 \\ 1 & 0 \end{pmatrix}, Z = \begin{pmatrix} 1 & 0 \\ 0 & -1 \end{pmatrix}.$$

when l is odd, l may range from 0 to one less than twice the base-two logarithm of the number of antennas in the first plurality of antennas, I may represent an identity matrix, and X and Z may represent respective Pauli matrices defined as follows:

$$S_l = X \otimes I_{2^{\lfloor \frac{l}{2} \rfloor}} \otimes X \otimes I_{2^{k-1}} \otimes X \otimes I_{2^{k-1-\lfloor \frac{l}{2} \rfloor}}$$

In any of the disclosed embodiments, the symbol mapper may be dependent on a target data rate for transmission of the information.

BRIEF DESCRIPTION OF THE DRAWINGS

Embodiments of the present disclosure may be better understood through reference to the following figures in which.

DETAILED DESCRIPTION OF PARTICULAR EMBODIMENT(S)

Figure 1:
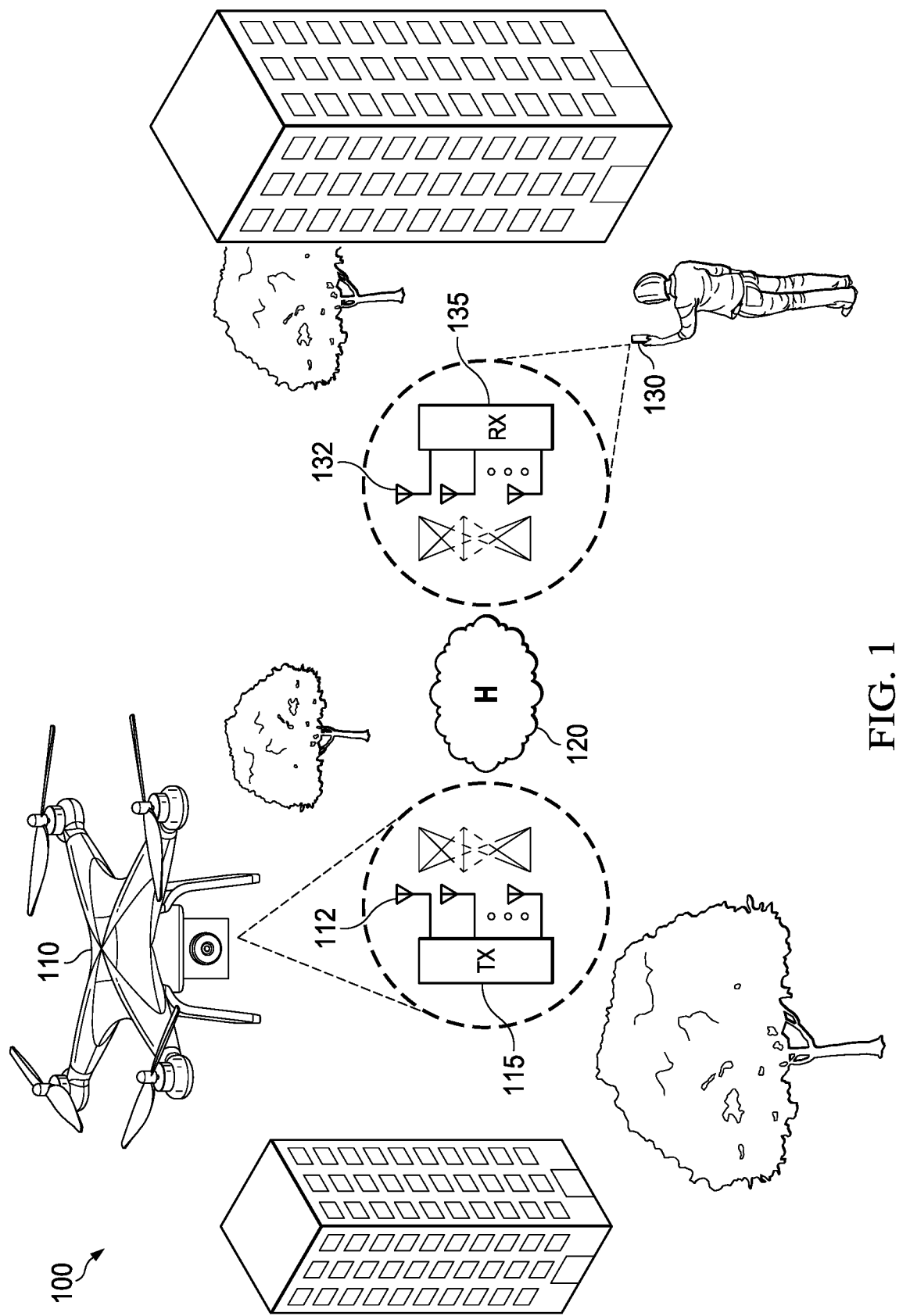
FIG. 1 is a block diagram illustrating selected elements of a wireless communication system 100, according to one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments. For a more complete understanding of the present disclosure, reference is made to the following description and accompanying drawings.

Disclosed herein are methods for encoding and decoding information for transmission over wireless channels with multiple transmit and receive antennas. In at least some embodiments, the disclosed methods of decoding do not rely on an estimate of the wireless channel. The construction is amenable to a variety of code rates and has minimal latency for a given asymptotic high-SNR performance.

In at least some embodiments, the space-time block code described herein for noncoherent communication may apply techniques from the field of quantum error correction. For example, a multiple-input multiple-output (MIMO) channel may be decomposed into operators used in quantum mechanics, and a noncoherent space-time code may be designed using the quantum stabilizer formalism. An optimal space-time decoder may be derived in accordance with the space-time encoders described herein. This approach has been compared to a coherent space-time coding approach and a noncoherent differential approach, achieving comparable or better performance.

Space-time codes are a family of methods employed to increase the channel diversity of a communication system by re-transmitting information over multiple spatial and time degrees of freedom. Communication approaches leveraging diversity may provide increased reliability by sending information over multiple independent channel realizations. This results in a higher chance of being able to correctly decode the received signal. In at least some embodiments, the techniques described herein may protect against deep fade events, also known as outages, which contribute the largest source of symbol decoding errors in very slowly varying, rich scattering environments like Rayleigh fading.

As noted above, the wireless communication systems described herein may employ a specific noncoherent space-time block code (and a corresponding decoder) that was designed using techniques inspired by quantum error correcting codes. A noncoherent space-time code may be defined as a space-time code that is designed for use in a wireless communication system that does not explicitly estimate the channel. However, such a code may also be used in a wireless communication system that does estimate the channel. These techniques may be used to design codes of various data rates (i.e., the number of bits transmitted per second per Hz of bandwidth). The space-time block code described herein was designed, in part, by drawing a comparison between noncoherent wireless channels and quantum channels and applying a code for an idealized quantum channel to a non-ideal wireless channel. Through numerical simulations, it has been found that these codes result in improved performance (in terms of bit error rate) in the low-data-rate regime with respect to other noncoherent and coherent space-time block-code constructions with analogously short coherence times. In some embodiments, the disclosed techniques may be used to reliably communicate information over multiantenna channels with minimal latency at low rates, which may be especially useful in the regime of ultra-reliable low-latency communication or in tactical communication environments.

FIG. 1 is a block diagram illustrating selected elements of a wireless communication system 100, according to one embodiment. In this example, a transmitter 115 including multiple transmitting antennas 112 is installed on a drone 110, and a receiver 135 including multiple receiving antennas 132 is included in a mobile communication device 130. The wireless communication channel 120 illustrated in FIG. 1 may be a MIMO channel characterized by an unknown channel matrix. In this example, information to be transmitted between transmitter 115 and receiver 135 over wireless communication channel 120 may be transmitted collectively by the multiple transmitting antennas 112 and received collectively by the multiple receiving antennas 132 using the space-time encoding techniques described herein to protect against certain types of errors. For example, these techniques may protect data from environmental distortion (i.e., noise) and/or deep fade events, as described herein. In some embodiments, these techniques may be applied in wireless communication systems that experience frequency hopping or other scenarios in which the coherence time is short, such as high mobility environments.

Unlike existing coding techniques that utilize estimates of the communication environment to transmit and receive information, quantum channel coding and noncoherent space-time coding do not rely on estimating the channel. Instead, these code designs leverage few assumptions about the channel. For example, in some embodiments, the channel may be assumed to have coherence over a predefined time period and additive noise, such as Gaussian noise. In at least some embodiments, the coherence interval, in terms of channel uses, may be approximately 2 times the number of antennas in the transmitter.

A block-fading channel model assumes that the channel coefficients remain constant for a relatively short block of consecutive symbols but may change for the next block. In other words, the block fading model assumes extremely short coherence times.

As described in more detail herein, a code for noncoherent communication has been designed based on quantum stabilizer codes. The design of the code may begin with a decomposition of the communication channel into elements of the Pauli group, a well-known matrix basis from quantum mechanics. The transmitted information is viewed as a quantum state and the code is designed to mitigate the effects of the channel under the assumption of infinite signal-to-noise ratio (SNR). An optimal decoding rule is then derived for the noisy case.

The theory of quantum error correction (QEC) defines conditions allowing for the correction of a broad class of channel errors. Many families of QEC codes were developed by directly extending classical error correcting codes. For example, Calderbank-Shor-Steane (CSS) codes generalize self-dual classical codes to the quantum setting. A CSS construction based on low-density parity-check (LDPC) codes, which are linear error correcting codes, was developed for protecting large blocks of qubits against noise. The space-time coding techniques described herein approach the problem from the opposite direction, using quantum mechanical concepts to inspire algorithms for classical communication in the noncoherent setting.

Estimation of the capacity of the noncoherent channel has been derived for particular cases, as described in the literature. The capacity achieving code construction performs sphere packing on the Grassmann manifold, leading to codes using Grassmannian line packings. A differential encoding based on matrix groups has been proposed that implicitly performs channel estimation, although the estimate is updated using only data from two coherence intervals. Differential coding has also been extended to matrix families that are not groups.

In one earlier approach, a subspace code, namely a Grassmannian line packing for noncoherent communication, was derived using formalism from the Pauli group and stabilizer coding. While the present approach similarly exploits both Grassmannian line packings and quantum stabilizer coding, the approach to the coding problem described herein differs from the earlier approach in several significant ways. In one example, the previous approach included a construction for Grassmannian line packings designed to maximize spectral efficiency (i.e., the rate of communication per unit of bandwidth). In practice, such constructions may only be useful in the long blocklength regime. In another example, the previous approach is a construction based on operator Reed-Mueller codes over the Pauli Group. It is not optimized for optimal performance at high signal to noise ratio, nor in terms of the symbol error rate performance metric. In contrast, the approach presented herein proposes to (directly) use codewords from a particular set quantum stabilizer codes as codewords in a space-time block code. The resulting code is particularly well suited for use at short blocklengths and is optimized for high SNR performance.

Notation: In the descriptions that follow, bold lower-case letters, such as a, are typically used to denote column vectors, and bold upper-case letters, such as A, are typically used to denote matrices. Non-bold letters are typically used to denote scalars. The element in the $i^{th}$ row and $k^{th}$ column of a matrix A is denoted by $[A]_{i,k}$. In general, the k×k identity matrix is denoted by $I_k$. The 2×2 identity matrix is used so often that the subscript is often dropped, i.e. $I_2 = I$. The notation tr(A) is used to denote the trace, det(A) the determinant, $A^T$ the transpose, and A* the conjugate transpose. For positive semi-definite matrices, $$A^{\frac{1}{2}}$$

denotes the matrix square root. The notation |a| is used to denote the absolute value of a scalar. The notation $\mathbb{E}(\cdot)$ is used to denote expectation. The symbol ⊗ is used to denote the tensor product when acting on vector spaces (i.e. $\mathbb{C}^2 \otimes \mathbb{C}^2$) and to denote the Kronecker product when acting on vectors or matrices. Note that the Kronecker product is an operation on two matrices of arbitrary size resulting in a block matrix. The notation $\mathcal{N}_\mathbb{C}(\mu, \Sigma)$ is used to denote a complex circularly symmetric normal distribution with mean $\mu$ and covariance $\Sigma$. If A=cB where c≥0, this is denoted as A∝B.

Qubits, or quantum bits, are the natural generalization of a bit in quantum computing. A qubit represents the state of a two-level system, such as the polarization of a photon, and is the most elementary example of quantum state. A qubit is represented as a state vector $q=[\alpha, \beta]^T \in \mathbb{C}2$ with $q^*q=|\alpha|^2+|\beta|^2=1$ by convention. Equipping $\mathbb{C}^2$ with the standard inner product $\langle q, p \rangle = q^*p$ leads to a definition of a qubit state as an element of a two-dimensional complex Hilbert space. In discrete time, the evolution of a closed quantum system is unitary. That is to say, $q_{n+1}=Uq_n$, where $U \in \mathbb{C}^{2 \times 2}$ with $U^*U=I$. The concept of applying unitary operators (which is possible to good approximation) comes up often in quantum computing and may be used in the space-time coding described herein.

In general, the act of measuring, or observing, a quantum state causes the system to change. An important class of quantum measurements are projective measurements. Projective measurements are defined in terms of an observable, which is a Hermitian operator M on the state space of the system of interest. Let m denote an eigenvalue of M and let $P_m$ be the projector onto the m eigenspace. The observable M can thus be orthogonally diagonalized as $$M = \sum_m m P_m$$

where $P_n P_m = 0$ when n≠m. The outcome of "measuring the observable M" is an eigenvalue m. If ψ is a quantum state, then the probability of measuring m is given by $p(m)=\psi^* P_m \psi$. Given that the outcome m occurs, the system after measurement collapses to the state $P_m \psi / \sqrt{p(m)}$. It has been discovered that projective measurements, coupled with unitary evolution, may be used to fully describe general quantum measurements.

A notable feature of quantum measurement is that the global phase of a state is not observable. If $x=[\alpha, \beta]^T$ and $y=e^{j\theta}[\alpha, \beta]^T$, then, for a measurement in all possible bases, the distributions of outcomes for x and y are the same. For this reason, one often works with density matrices. A state q can be represented by its density matrix $Q=qq^*$. The previously described formalism can be represented analogously. A state Q that evolves by the unitary U becomes the state $UQU^*$. The Born rule for projective measurements says that a state Q evolves to $P_m Q P_m/p(m)$ with probability $p(m)=\text{Tr}(P_m Q P_m)$. Density matrices may additionally provide a convenient way to describe quantum systems that have classical uncertainty. If a system is prepared in the state ψ with probability $p_i$, then the system may be represented by the density matrix, as shown below:

$Q = \Sigma_i p_i \psi_i \psi_i^*$.

This example can be extended to the case in which the prepared state has a continuous distribution and ensures that measurement probabilities are properly modeled. A state with a rank-one density matrix is known as a pure state and corresponds to the case in which there is no classical uncertainty about the prepared state. A state with a higher-rank density matrix is known as a mixed state.

Systems of many qubits can be represented as extensions of a single qubit system with the tensor and Kronecker products. The state space of an n-qubit system is the tensor product of the n component single qubit systems, i.e. $\mathbb{C}^{2^n} = \mathbb{C}_2 \otimes \mathbb{C}^2 \ldots \otimes \mathbb{C}^2$. Any normalized vector in $\mathbb{C}^{2^n}$ is a valid state vector. For example, if $q_1$ and $q_2$ are single qubit systems, the two-qubit composite system may be given by $q_1 \otimes q_2$. Analogously, if $Q_1$ and $Q_2$ are density matrix representations of two systems, the composite system may have a density matrix of $Q_1 \otimes Q_2$. Any positive semidefinite operator with a trace equal to unity may be a valid density operator. In multi-qubit systems, observables and measurements may be defined in the relevant higher dimensional space.

The fidelity provides a notion of distance between quantum states. The fidelity function $F(Q_1, Q_2) \in [0,1]$ is a symmetric function of its density matrix arguments. It is defined, for general mixed states as $$F(Q_1, Q_2) = tr\left( \left( Q_1^{\frac{1}{2}} Q_2 Q_1^{\frac{1}{2}} \right)^{\frac{1}{2}} \right).$$

A low fidelity implies that states are "far apart," and the fidelity is equal to unity if its arguments are the same. The fidelity between two pure states is $F(q_1, q_2)=|q_1^* q_2|$. The fidelity between a pure state q and a mixed state Q is $F(q, Q)=\sqrt{q^* Q q}$. The fidelity can be used to induce a metric on states, d, via $d(Q_1, Q_2)=\arccos(F(Q_1, Q_2))$.

Stabilizer codes are a class of quantum error correcting codes designed to protect against a wide range of quantum errors. Their construction is briefly summarized below.

The n-qubit Pauli group, $P_n$, is the set of operators in $\mathbb{C}^{2^n \times 2^n}$ that can be written as a tensor product of n of the 2×2 Pauli matrices I, X, Y, Z, up to a scalar multiple of $\alpha \in \{\pm 1, \pm j\}$, where $$X = \begin{pmatrix} 0 & 1 \\ 1 & 0 \end{pmatrix}, Y = \begin{pmatrix} 0 & -j \\ j & 0 \end{pmatrix}, Z = \begin{pmatrix} 1 & 0 \\ 0 & -1 \end{pmatrix}.$$

The group multiplication operation is defined as standard matrix multiplication. Elements of $P_n$ are unitary and are either Hermitian or skew-Hermitian. Thus, they are orthogonally diagonalizable, with eigenvalues ±1 or ±j. Any two Pauli operators either commute or anti-commute.

A stabilizer, S, is a commutative (Abelian) subgroup of $P_n$ that does not contain the negative of the identity element, $-I_{2^n}$. The additional requirement of closure under the group multiplication operation implies that elements of S must have α=1. Thus, elements of S are Hermitian operators with eigenvalues equal to ±1.

A stabilizer code C(S) is defined as the subspace of $\mathbb{C}^{2^n}$ formed by the intersection of +1 eigenspaces of the operators in S. An efficient description of the group S is its generators. A set $G_S$ of generators of S is a set of elements of $P_n$ such that every element of S is a product of elements in $G_S$. A generator set $G_S$ is called independent if the set obtained by removing an element from $G_S$ fails to generate all elements of S. If S is a stabilizer with an independent generator containing n−k elements, it can be shown that C(S) is a $2^k$ dimensional vector space. Furthermore, a state $\psi \in C(S)$ if and only if $S_n \psi = \psi$ for all $S_n \in G_S$. Letting $s_i$ denote complex constants and $v_i$ an orthonormal basis for $C(S)$, a general codeword for $C(S)$ can be written as $$x = \sum_{i=0}^{2^k-1} s_i v_i, \text{ with } \sum_{i=0}^{2^k-1} |s_i|^2 = 1.$$

A codeword is thus an arbitrary unit vector in $C(S)$.

There are several criteria that can be used to determine which quantum errors a stabilizer code can correct. One approach is as follows. Consider a set of error operators $E \subset P_n$. Each error $E \in E$ either commutes or anti-commutes with each generator of the stabilizer group. A sufficient condition for the stabilizer code to correct the errors in E is for each $E \in E$ to possess a unique commutation relationship with respect to the elements of $G_S$. Thus, the stabilizer construction guarantees that each error $E_i \in E$ maps the codespace $C(G)$ bijectively to a $2^k$ dimensional subspace of $\mathbb{C}^{2^n}$. Furthermore, the uniqueness of the commutation relationships guarantees that different errors map $C(G)$ to different error subspaces $E_i$. Formally, $E_i$ is the image of E restricted to $C(G)$ (i.e. $E_i = \{y \in \mathbb{C}^{2^n} | \exists x \in C(G) \text{ with } y = E_i x\}$) and a unique commutation relationship guarantees that $E_i \cap Ej = \emptyset$ when $i \neq j$.

It should be noted that this criterion is sufficient but not necessary; the stabilizer formalism naturally lends itself to degenerate quantum codes, where multiple errors yield the same syndrome and are correctable by the same operation. Consider a correctable error E and $V \in S$. Both EV and E will have the same commutation relations with respect to the stabilizer generators, and thus both EV and E map an encoded state to the same subspace. Indeed, for $x \in C(G)$, $EVx = Ex$; namely, the effect of the errors on the codeword is exactly the same.

In the quantum setting, the stabilizer decoding process consists of performing projective measurements on the received state. The measurement observables are the stabilizer generators. This process projects the state into an intersection of the +1 or −1 eigenspaces of each $S \in G(S)$. Thus, after the measurements the state collapses into one of the error subspaces $E_k$. The measurement outcomes form a syndrome (analogous to the classical syndrome) and identify into which subspace the state collapsed. The error correction conditions guarantee that the application of a correction (e.g., the error operator itself) for any correctable error yielding the measured syndrome recovers the encoded state. This process demonstrates that a stabilizer code that can correct errors in a set E can correct an arbitrary linear combination of correctable errors.

In some embodiments, projection operations may annihilate error operators that are not consistent with the measured commutation relationship. For example, consider the state $y = (c_j E_j + c_k E_k)t$ with $t \in C(S)$. If $G \in G_S$ anti-commutes with an error $E_j$ but commutes with $E_k$ and a measurement of G returns a 1 (corresponding to a commutation), the state after measurement is $\hat{y} = (I+G)y = E_k t$.

In the descriptions that follow, a specific canonical received signal model is assumed for noncoherent wireless communication. The system includes $N_{TX} = M1$, $N_{RX} = M2$ antennas, respectively, at the transmitter and receiver. In at least some embodiments $M1 = M2$. A narrowband model with a single-tap (frequency flat) MIMO channel represented as $H \in \mathbb{C}^{M1 \times M2}$ is assumed. It is also assumed that the channel is coherent for TC channel uses. The transmitted, received, and additive noise signals are denoted by the complex matrices $T \in \mathbb{C}^{M1 \times TC}$, $Y \in \mathbb{C}^{M2 \times TC}$, and $N \in \mathbb{C}^{M2 \times TC}$, respectively, where the columns correspond to the time instants in the coherence interval. In this system model, N may be assumed to be a complex Gaussian random matrix with independent, identically distributed entries such that $[N]_{i,j} \sim Nc(0, \sigma_n^2)$. Furthermore, a Rayleigh fading model may be assumed, where the entries of H are independent and identically distributed with $[H]_{i,j} \sim Nc(0,1)$. The vectorized fading channel may be represented as:

$$\overline{H} = \sum_{j=0}^{N_{ant}^2} c_j E_j = I_T \otimes \sum_{\substack{F_j \in P_{k_1} \\ |P_k| = 4^k = N_{ant}^2}} c_j F_j$$

Finally, it is assumed that H is constant over the coherence interval but that the channel realizations at different coherence intervals are independent. This model may be especially appropriate for a frequency hopping system in an environment with rich scattering. The received signal over the coherence interval is now given by:

$$Y = HT + N.$$

Using the standard vectorization identity, letting $y = \text{vec}(Y) \in \mathbb{C}^{T2^k}$, $t = \text{vec}(T) \in \mathbb{C}^{T2^k}$, $n = \text{vec}(N) \in \mathbb{C}^{T2^k}$, and $\overline{H} = I_T \otimes H$, the equation above may be written as:

$$y = \overline{H}t + n.$$

It has been discovered that if $M = 2^k$ for some integer k and $T = 2^n \geq 2M$, this form of the channel model is amenable to the design of a stabilizer code.

Figure 2:
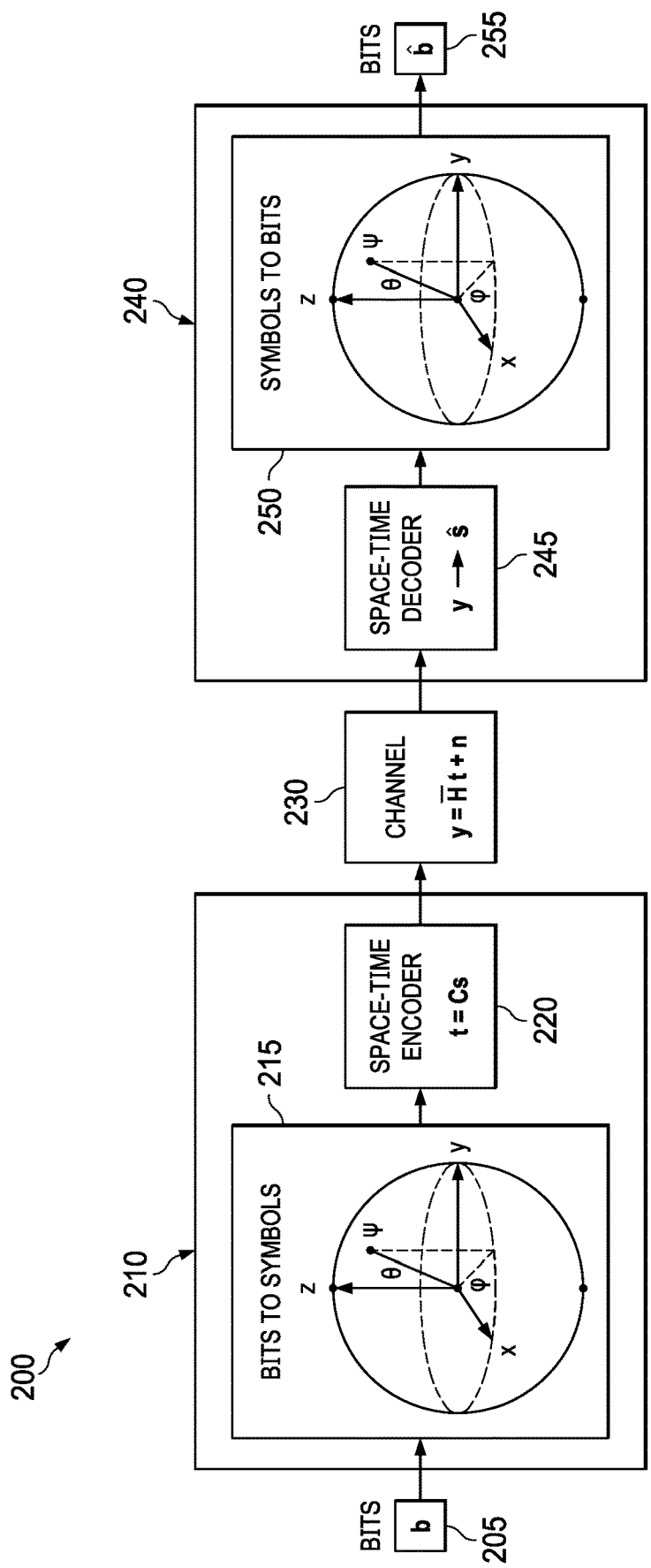
FIG. 2 is a block diagram illustrating a MIMO wireless communication system, in accordance with some embodiments.

FIG. 2 is a block diagram illustrating a MIMO wireless communication system 200 including a transmitter 210, a channel 230, and a receiver 240. In the illustrated example, transmitter 210 includes, among other elements, a symbol mapper 215 configured to map an input block 205 of an incoming binary bit stream representing information to be transmitted to a symbol representing an ordered plurality of complex numbers, the input block including a predetermined number of binary bits, and a space-time encoder 220 configured to apply an encoding operator to the symbol to produce a vectorized space-time codeword defining electrical signals to be transmitted by the transmitter, the encoding operator being dependent on a plurality of predefined stabilizer generators. Symbol mapper 215 may map each input block 205 containing a predetermined number of bits to a symbol, which may be viewed as analogous to a qubit, represented by an ordered pair of complex vectors of modulus one. The symbol may be chosen from a set of symbols in a constellation, where there is a 1-to-1 mapping between possible input blocks and available symbols. The constellation may be dependent on a modulation format employed in the transmission of information in wireless communication system 200. In some embodiments, the magnitude and phase of each complex number may represent the in-phase [I] and quadrature [Q] components of a baseband signal. Space-time encoder 220 may then map the symbol, which is essentially a complex 2-vector, to a symbol in a higher dimensional space, such as to an 8-vector space-time symbol, in some embodiments, by encoding the symbol using a space-time codeword.

In at least some embodiments, the number of antennas in the transmitter and the number of antennas in the receiver may be the same. In at least some embodiments, the number of antennas in each of the transmitter and the receiver may be equal to a power of two. However, the techniques described herein may be applicable in wireless communication systems in which the number of antennas in the transmitter and the number of antennas in the receiver are not the same and/or the number of antennas in the transmitter or in the receiver is not equal to a power of two. In some embodiments, MIMO wireless communication system 200 may be a 2×2 MIMO system in which transmitter 210 includes two transmitting antennas and receiver 240 includes two receiving antennas.

Transmitter 210 may also include circuitry to collectively transmit, by a first plurality of antennas of the transmitter to a second plurality of antennas of a receiver over a wireless transmission channel, the electrical signals defined by the vectorized space-time codeword (not shown in FIG. 2). For example, the 8-vector space-time symbol may represent the electrical signals to be transmitted over four time instances, or four uses, of a two-by-two MIMO channel. In the illustrated example, channel 230 may be a MIMO channel characterized by an unknown channel matrix H, as described herein.

In the illustrated example, receiver 240 includes, among other elements, a space-time decoder 245 configured to recover the symbol from the electrical signals transmitted by the transmitter using a decoding operation that is based on maximum likelihood inference, and a symbol de-mapper 250 configured to recover the input block 205 from the symbol as recovered input block 255. In other words, space-time decoder 245 may return an estimate of the symbol transmitted by transmitter 210. Symbol de-mapper 250 may then demodulate the estimated symbol to recover the bits of the input block.

According to the assumptions described herein for a wireless communication system, a model for transmitting a single coherent block in the system may be shown as:

$$\begin{pmatrix} Y_{1,1} & \cdots & Y_{1,TC} \\ \vdots & \ddots & \vdots \\ Y_{M2,1} & \cdots & Y_{M2,TC} \end{pmatrix} =$$

$$\begin{pmatrix} H_{1,1} & \cdots & H_{1,M1} \\ \vdots & \ddots & \vdots \\ H_{M2,TC} & \cdots & H_{M2,M1} \end{pmatrix} \begin{pmatrix} X_{1,1} & \cdots & X_{1,TC} \\ \vdots & \ddots & \vdots \\ X_{M1,1} & \cdots & X_{M1,TC} \end{pmatrix} + \begin{pmatrix} N_{1,1} & \cdots & N_{1,TC} \\ \vdots & \ddots & \vdots \\ N_{M2,1} & \cdots & N_{M2,TC} \end{pmatrix}$$

A vectorized form of this model may be shown as:

$$\begin{pmatrix} \begin{bmatrix} Y_{1,1} \\ \vdots \\ Y_{M2,1} \end{bmatrix} \\ \vdots \\ \begin{bmatrix} Y_{1,TC} \\ \vdots \\ Y_{M2,TC} \end{bmatrix} \end{pmatrix} = \begin{pmatrix} \begin{pmatrix} H_{1,1} & \cdots & H_{1,M1} \\ \vdots & \ddots & \vdots \\ H_{M2,1} & \cdots & H_{M2,M1} \end{pmatrix} & & 0 \\ & \ddots & \\ 0 & & \begin{pmatrix} H_{1,1} & \cdots & H_{1,M1} \\ \vdots & \ddots & \vdots \\ H_{N,1} & \cdots & H_{M2,M1} \end{pmatrix} \end{pmatrix}$$

$$\begin{pmatrix} \begin{bmatrix} X_{1,1} \\ \vdots \\ X_{M1,1} \end{bmatrix} \\ \vdots \\ \begin{bmatrix} X_{1,TC} \\ \vdots \\ X_{M1,TC} \end{bmatrix} \end{pmatrix} + \begin{pmatrix} \begin{bmatrix} N_{1,1} \\ \vdots \\ N_{M2,1} \end{bmatrix} \\ \vdots \\ \begin{bmatrix} N_{1,TC} \\ \vdots \\ N_{M2,TC} \end{bmatrix} \end{pmatrix}$$

In at least some embodiments, the wireless communication system may include two antennas at both the transmitter and the receiver. In one such embodiment, a narrowband model with a single-tap MIMO channel H∈ $\mathbb{C}^{2\times2}$ is assumed, as is a channel coherence time of TC=4 channel uses. The transmitted, received, and additive noise signals may be denoted by complex 2×4 matrices T, Y, and N, respectively, of the form defined above, where the columns correspond to the time instants in the coherence interval.

A vectorized model for this specific system may be shown as:

$$\begin{pmatrix} \begin{bmatrix} Y_{11} \\ Y_{21} \end{bmatrix} \\ \begin{bmatrix} Y_{12} \\ Y_{22} \end{bmatrix} \\ \begin{bmatrix} Y_{13} \\ Y_{23} \end{bmatrix} \\ \begin{bmatrix} Y_{14} \\ Y_{24} \end{bmatrix} \end{pmatrix} = \begin{pmatrix} \begin{pmatrix} H_{11} & H_{12} \\ H_{21} & H_{22} \end{pmatrix} & & & 0 \\ & \begin{pmatrix} H_{11} & H_{12} \\ H_{21} & H_{22} \end{pmatrix} & & \\ & & \begin{pmatrix} H_{11} & H_{12} \\ H_{21} & H_{22} \end{pmatrix} & \\ 0 & & & \begin{pmatrix} H_{11} & H_{12} \\ H_{21} & H_{22} \end{pmatrix} \end{pmatrix}$$

$$\begin{pmatrix} \begin{bmatrix} X_{11} \\ X_{21} \end{bmatrix} \\ \begin{bmatrix} X_{12} \\ X_{22} \end{bmatrix} \\ \begin{bmatrix} X_{13} \\ X_{23} \end{bmatrix} \\ \begin{bmatrix} X_{14} \\ X_{24} \end{bmatrix} \end{pmatrix} + \begin{pmatrix} \begin{bmatrix} N_{11} \\ N_{21} \end{bmatrix} \\ \begin{bmatrix} N_{12} \\ N_{22} \end{bmatrix} \\ \begin{bmatrix} N_{13} \\ N_{23} \end{bmatrix} \\ \begin{bmatrix} N_{14} \\ N_{24} \end{bmatrix} \end{pmatrix}$$

Figure 3:
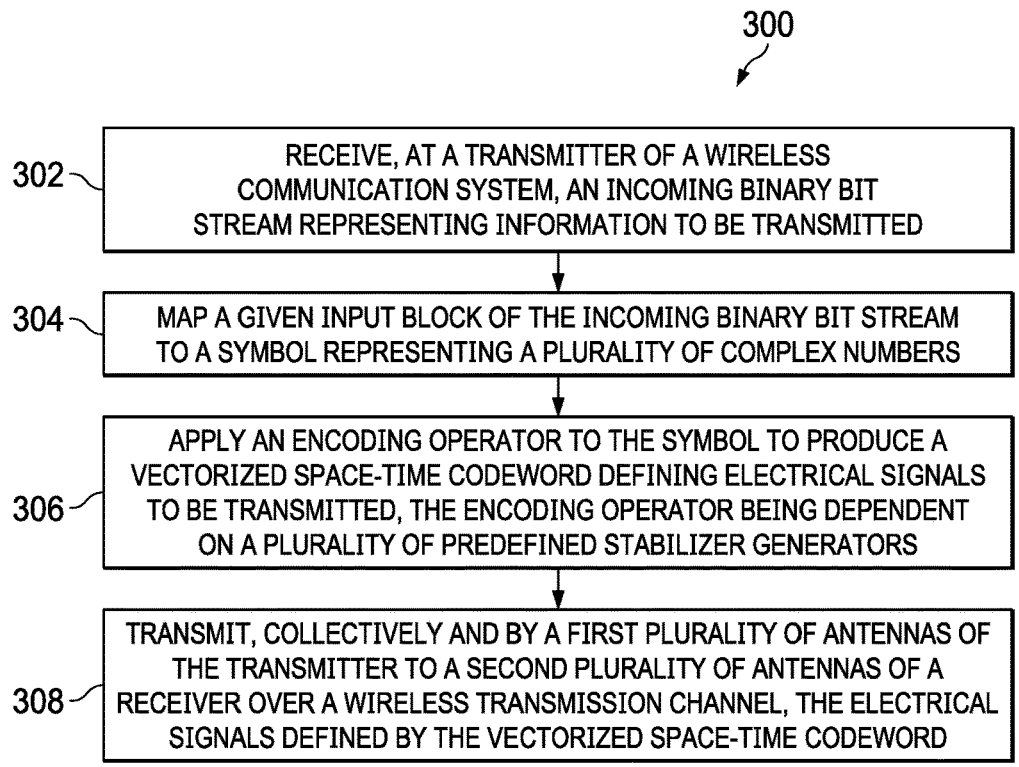
FIG. 3 illustrates selected elements of an example method for space-time encoding in a wireless communication system in flow diagram form, according to one embodiment.

An example method 300 for space-time encoding in a wireless communication system is illustrated by the flow diagram in FIG. 3, according to one embodiment. As illustrated at 302, the method may include receiving, at a transmitter of a wireless communication system, an incoming binary bit stream representing information to be transmitted.

At 304, the method may include mapping a given input block of the incoming binary bit stream, having a predefined number of bits, to a symbol representing a plurality of complex numbers. The symbol may be chosen from a set of $2^q$ symbols in a constellation, where q is the number of bits in each input block, such that there is a 1-to-1 mapping between possible input blocks and available symbols. In at least some embodiments, each symbol s may include an ordered pair of complex numbers is of the form $$s = \begin{bmatrix} \alpha \\ \beta \end{bmatrix}.$$

As described in more detail herein, the constellation of symbols may be based on a Grassmannian line packing. In at least some embodiments, the symbol mapper may be dependent on a target data rate for transmission of the information. The target data rate r may be equal to the number of bits in each input block divided by the coherence interval. The available code rates, R (in bits/second/Hz) may be defined by:

$$R = \frac{\log_2(|C|)}{2N_{ant}}.$$

At 306, method 300 may include applying an encoding operator to the symbol to produce a vectorized space-time codeword defining electrical signals to be transmitted, the encoding operator being dependent on a plurality of predefined stabilizer generators. As described in more detail herein, the encoding causes a linear mapping t=Cs from the symbol s to a respective codeword t in a codeword space. In at least some embodiments, the codeword space is a $2^m \times 2$ matrix defined via the predefined stabilizer generators, where m is the number of antennas in the transmitter. The codeword t is a $2^{m^2}$ vector.

At 308, the method may include transmitting, collectively and by a first plurality of antennas of the transmitter to a second plurality of antennas of a receiver over a wireless transmission channel, the electrical signals defined by the vectorized space-time codeword. More specifically, the first m elements of t are a complex baseband representation of the electrical signals to be transmitted using the m transmitting antennas at the first time instant, the second m elements of t are the complex baseband representation of the electrical signals to be transmitted at the second time instant, and so on. At each time instant, the m elements of t may be upconverted before being transmitted.

Designing a quantum stabilizer code for the space-time channel requires a representation of the channel model analogous to a quantum operation. For example, t may be modeled as an encoded quantum state. Like their classical linear counterparts, a quantum code is a linear subspace. Quantum states are encoded in higher dimensional quantum systems via a linear map. The generator matrix for a code that maps $\ell$ qubits to m is defined as the (tall) matrix $C \in \mathbb{C}^{2^{m} \times 2^{\ell}}$ whose columns form an orthonormal basis for the code. The state $s \in C^{2^{\ell}}$ is encoded into $t \in C^{2^m}$ via $$t = Cs.$$

Substituting this into the earlier equation yields:

$$v = \overline{H}Cs + n.$$

A "pure" quantum state is a normalized vector defined up to a "global phase". Notably, two pure states $\hat{\psi}$ and $\psi$ are equivalent by definition if $\hat{\psi}\hat{\psi}^* = \psi\psi^*$. Thus, a pure state represents a one-dimensional subspace of the ($2^{\ell}$ dimensional) state space. Formally, a state is a normalized representation of a point on the Grassmann manifold GF $(1, 2^{\ell})$. In the descriptions herein, s is interpreted as a quantum state and a goal is to design a code that recovers an estimate ŝ such that, at infinite SNR, ŝŝ*=ss*. The vector s may represent the transmitted symbol. The first step in the modulation may be to map bits to some constellation C of vector symbols s with constant modulus, which may be viewed as representing a quantum state to be encoded. Note that since two quantum systems y and x are equivalent if xx*=yy* the constellation may be thought of as an alphabet of quantum states. The constellation C may be chosen as a Grassmannian line packing in $2^{\ell}$ dimensions, which is later shown to minimize an upper bound on the probability of error. While noncoherent space-time codes may be designed via Grassmannian line packings of the row space of T, the packing used to design C may be in a lower dimensional space.

For models with zero-mean noise that is independent of the channel, a reasonable choice for an "emulated" quantum channel, E, may be as follow:

$$tt^* \xrightarrow{\varepsilon} \mathbb{E}(vv^* \mid t).$$

This map is both completely positive (by definition) and is convex linear in tt*. Thus, it may be used to form a valid quantum channel up to a normalizing constant. Via Choi's Theorem, for some set of so-called "error operators" E, this may be written as:

$$E(tt^*) = \Sigma_{E_i \in E} E_i tt^* E_i^*.$$

The construction of an emulated quantum channel model for the $N_{TX} = N_{Rx} = 2$ case is described in more detail below.

Given a quantum code C designed to protect against some set of errors, one can construct a "recovery operation" that is a physically realizable quantum operation mapping a noisy state back into the codespace. If the code is such that all possible errors in some channel are correctable, then the recovery operation is guaranteed to map the noisy channel output back to its input. This recovery operation can be written as a quantum operation via $$R_C(p) = \Sigma_i E_i^* P_i p P_i E_i$$

for a set of projectors $P_i$ and a set of correctable errors $E_i$ which may, in general, be linear combinations of the elements of $E_i$.

A code's emulated recovery operation may be defined as a mapping from positive matrices to positive matrices given by:

$$f_{R_C}(p) = \Sigma_i E_i^H P_i p P_i E_i$$

It has been discovered that if a channel induces an emulated channel described by a set of error operators E that are correctable by some code C, this may yield, for a random real positive constant c:

$$C^* f_{R_C}(vv^*) C \stackrel{a.s.}{=} c(ss^*).$$

Since the input constellation C is constant modulus, the Cauchy-Schwarz inequality, for an input symbol $s \in C$, yields:

$$s \stackrel{a.s.}{=} \arg \max_{\hat{s} \in C} \hat{s}^* C^* f_{R_C}(vv^*) C\hat{s}.$$

It has been discovered that, in the finite SNR case, it is impossible to design a quantum code to correct all of the possible errors that arise. Therefore, a code is constructed assuming infinite SNR and the optimal decoder for the finite SNR case is derived therefrom. It has been discovered that, in a setting that includes a linear Gaussian channel with additive Gaussian noise, the maximum likelihood (ML) decoding rule for finite SNR is given by the equation shown in the immediately preceding paragraph.

An example construction of a noncoherent space-time code via the stabilizer formalism in a wireless communication system including 2 antennas at both the transmitter and the receiver is described in more detail below. The application of quantum error correcting codes in a wireless communication setting may be motivated by noting that at high SNR, the vectorized channel model may be well approximated by a stochastic linear combination of Pauli group elements, i.e., Pauli matrices.

The vectorized channel matrix $\overline{H}$ highlights the coherence of the channel coefficients over time and admits a basis decomposition in the Pauli basis $P_3$ of the form $$\overline{H} = I \otimes I \otimes (c_0 I + c_1 X + c_2 Z + c_3 Y)$$

$$= c_0 E_0 + c_1 E_1 + c_2 E_2 + c_3 E_3$$

where $$c_0 = ([H]_{1,1} + [H]_{2,2})/2$$

$$c_1 = ([H]_{1,2} + [H]_{2,1})/2$$

$$c_2 = ([H]_{1,1} - [H]_{2,2})/2$$

$$c_3 = j([H]_{1,2} - [H]_{2,1})/2$$

and $E_0 = I \otimes I \otimes I$, $E_1 = I \otimes I \otimes X$, $E_2 = I \otimes I \otimes Z$, $E_3 = I \otimes I \otimes Y$.

Defining $c = [c_0, c_1, c_2, c_3]^T$ yields $c \sim \mathcal{N}_{\mathbb{C}}(0, I_4/2)$. Note that at infinite SNR, the vectorized channel model may be written as $$v = \overline{H}t = \overline{H}Cs = (c_0 I_T \otimes I + c_1 I_T \otimes X + c_2 I_T \otimes Z + c_3 I_T \otimes Y)t.$$

The error set for this channel is $E = \{E_0, E_1, E_2, E_3\}$. This process is analogous to the quantum concept of channel discretization, in which a channel with a continuous set of possible realizations is equivalent to one that randomly applies a discrete set of error operators.

The construction of the noncoherent space-time code may include forming a stabilizer group for this error set. The operators $S_0 = X \otimes Z \otimes X$ and $S_1 = X \otimes X \otimes Z$ satisfy the necessary commutation relations to form a set of stabilizer generators, as summarized in Table 1.

TABLE 1

SUMMARY OF COMMUTATION RELATIONS BETWEEN STABILIZER AND ERROR OPERATORS. C DENOTES COMMUTATION AND A DENOTES ANTI-COMMUTATION

Commutation Relationships

|       | $S_0$ | $S_1$ |
|-------|-------|-------|
| $E_0$ | C     | C     |
| $E_1$ | C     | A     |
| $E_2$ | A     | C     |
| $E_3$ | A     | A     |

Because they commute, the stabilizer operators admit a partially intersecting+1 eigenspace, which has a two-dimensional basis spanned by the vectors $$v_0 = [1 0 0 - 1 0 1 1 0]^T \text{ and}$$

$$v_1 = [0 - 1 - 1 0 - 1 0 0 1]^T.$$

These vectors may be used to form a mapping that encodes two arbitrary complex numbers into a space-time codeword. Given a complex vector $s = [s_1, s_2]^T$ from a general codebook, the vectorized space-time codeword may be produced by applying an encoding operator $C = [v_0, v_1] \in \mathbb{C}^{8 \times 2}$ yielding the following:

$$t = Cs$$

In some embodiments, it may be assumed that the symbol energy is normalized, i.e., $s^*s = 1$. This assumption coupled with the definition of C guarantees that $t^*t = 4$ which gives an average power of unity over the coherence interval. The corresponding 2×4 code matrix for a codeword may be represented with the inverse vectorization operator $\text{vec}^{-1}: \mathbb{C}^8 \mapsto \mathbb{C}^{2 \times 4}$ $$T = \text{vec}^{-1}(Cs),$$

or $$T = \begin{bmatrix} s_1 & -s_2 & -s_2 & s_1 \\ -s_2 & -s_1 & s_1 & s_2 \end{bmatrix}.$$

This code, which provides full diversity despite the non-coherent setting, may be referred to as a generalized complex orthogonal design.

The symbol vector s may be viewed as an information carrying qubit state that is to be preserved via the stabilizer encoding. Using the interpretation of a qubit as a 1-dimensional subspace of $\mathbb{C}^2$, it is assumed that symbol vectors s are drawn uniformly from a constellation C. The constellations may be chosen as Grassmannian line packings in $\mathbb{C}^2$.

The detection rule described in more detail herein may motivate the choice of the Grassmannian line packing for the qubit constellation. Consider, for example, the expectation $$B = \mathbb{E}\left[\sum_{k=0}^{3} q_k q_k^* | s\right] = 4ss^* + 2\sigma_n^2 I_2$$

and the function $R_s(\hat{s}) = sBs^* - \hat{s}B\hat{s}^*$, where $s \neq \hat{s}$. This is the expected value of the difference between computing the statistic on the transmitted symbol as opposed to another, not transmitted symbol. It is expected that the dominant error will occur when $R_s(\hat{s})$ is minimized over all s and $\hat{s}$. Therefore, a constellation set with the maximal minimum $R_s(\hat{s})$ is desired. Since the transmit symbols are normalized, the definition of $R_s(\hat{s})$ indicates that for a N-point constellation encoding $\log_2(N)$ bits the set selected should be given by:

$$\hat{C} = \min_{C = \{s \in \mathbb{C}^2 | s^*s = 1\}, |C| = N} \max |\hat{s}^* s|^2.$$

This indicates that the constellation should be chosen as a Grassmannian line packing. Using this approach, a choice of constellation may be shown to minimize a bound on the probability of a symbol detection error.

Figure 4:
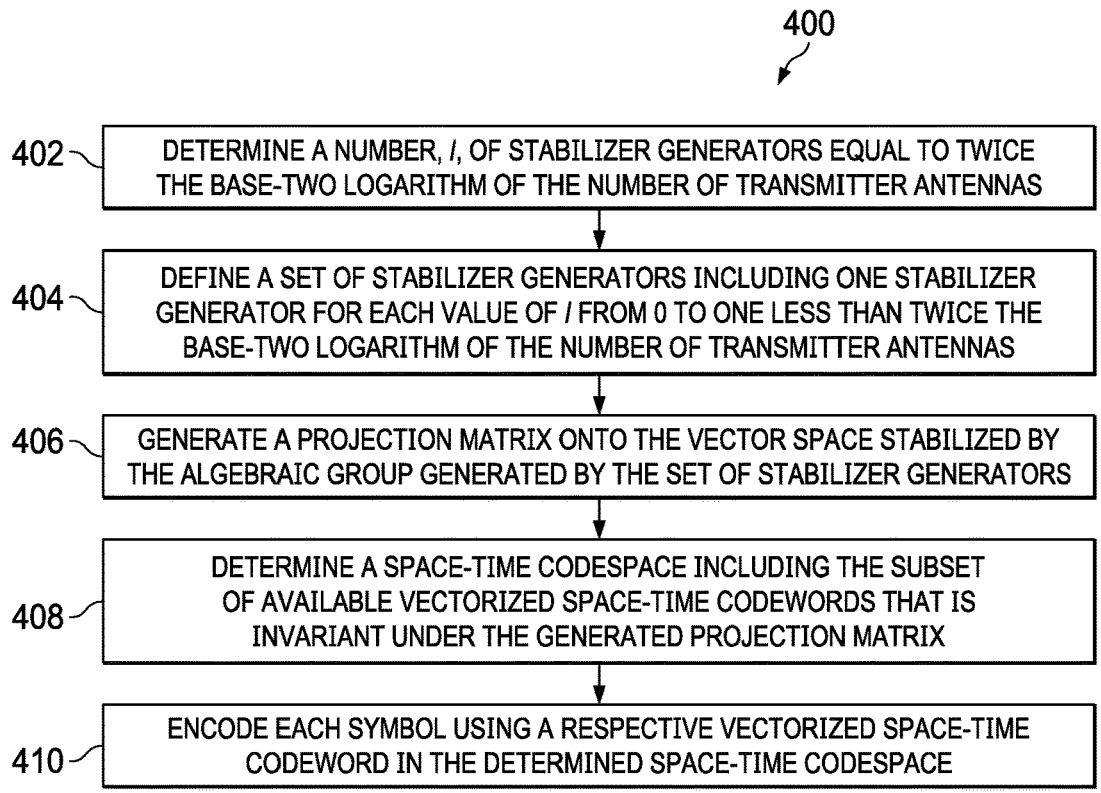
FIG. 4 illustrates selected elements of an example method for encoding symbols using space-time encoding in flow diagram form, according to one embodiment.

An example method 400 for encoding symbols using space-time encoding is illustrated by the flow diagram in FIG. 4, according to one embodiment. As illustrated at 402, the method may include determining a number, l, of stabilizer generators equal to twice the base-two logarithm of the number of transmitter antennas, or $2 \log_2(N_{ant})$.

At 404, the method may include defining a set of stabilizer generators including one stabilizer generator for each value of l from 0 to one less than twice the base-two logarithm of the number of transmitter antennas, or $2 \log_2(N_{ant}) - 1$. In at least some embodiments, each stabilizer generator S having an index value l of the plurality of predefined stabilizer generators may be defined as follows:

$$S_l = X \otimes I_{2^{\lfloor \frac{l}{2} \rfloor}} \otimes X \otimes I_{2^{k-1}} \otimes X \otimes I_{2^{k-1}} \text{ when } l \text{ is even,}$$

$$S_l = X \otimes I_{2^{\lfloor \frac{l}{2} \rfloor}} \otimes Z \otimes I_{2^{k-1}} \otimes Z \otimes I_{2^{k-1}} \text{ when } l \text{ is odd.}$$

Here, l ranges from 0 to $2 \log_2(N_{ant})-1$, I represents an identity matrix, and X and Z represent respective Pauli matrices defined as follows:

$$X = \begin{pmatrix} 0 & 1 \\ 1 & 0 \end{pmatrix}, Z = \begin{pmatrix} 1 & 0 \\ 0 & -1 \end{pmatrix}.$$

At 406, method 400 may include generating a projection matrix onto the vector space stabilized by the algebraic group generated by the set of stabilizer generators. In at least some embodiments, the projection matrix may be defined as follows:

$$P_0 = N_{ant}^{-2} \Pi_{q=0}^{2 \log 2(N_{ant})-1}(I_{2N_{ant}^2} + S_q).$$

At 408, the method may include determining a space-time codespace including the subset of available vectorized space-time codewords that is invariant under the generated projection matrix. Once the space-time codespace has been determined, it can be used to encode each of the symbols without repeating the operations shown at 402 through 408.

At 410, method 400 may include encoding each symbol using a respective vectorized space-time codeword in the determined space-time codespace as t=Cs. An example encoding, where $$\begin{pmatrix} \alpha \\ \beta \end{pmatrix}$$

is a symbol mapped to a particular input block of bits and represented as an ordered pair of complex numbers is encoded using a chosen codeword C may be shown as:

$$t = Cs = \frac{1}{\sqrt{2}} \begin{bmatrix} 1 & 0 \\ 0 & 0 \\ 0 & 0 \\ 1 & 0 \\ 0 & 1 \\ 0 & 0 \\ 0 & 0 \\ 0 & 1 \end{bmatrix} \begin{pmatrix} \alpha \\ \beta \end{pmatrix} = \frac{1}{\sqrt{2}} \begin{pmatrix} \alpha \\ 0 \\ 0 \\ \alpha \\ \beta \\ 0 \\ 0 \\ \beta \end{pmatrix}.$$

In this setting of quantum-inspired classical coding, the ideas of quantum measurement and syndrome decoding may be dispensed with in favor of the more familiar method of maximum likelihood (ML) inference. While, in at least some embodiments of the wireless communication systems described herein, the decoding process may be based on computing the ML decoding rule, the decoding process may lend itself to a quantum mechanical interpretation.

If it is assumed that the encoded symbol s is drawn uniformly from some constellation C, the maximum a posteriori rule reduces to the canonical ML problem of finding ŝ such that $$\hat{s} = \arg \max_{s \in C} f_{y|s}(s|y) = \arg \max_{s \in C} f_{y|s}(y|s).$$

Projection operators may be defined as follows:

$$P_0 = (I+S_0)(I+S_1)/4$$

$$P_1 = (I+S_0)(I-S_1)/4$$

$$P_2 = (I-S_0)(I+S_1)/4$$

$$P_3 = (I-S_0)(I-S_1)/4.$$

Note that, in this example, $P_0$ is the projector onto the codespace and $P_0+P_1+P_2+P_3=I$ is the identity. The receiver computes the four corresponding projections of the received vector y onto the codespace and the three error subspaces to obtain the following vectors:

$$P_0 y = c_0 t + P_0 n$$

$$P_1 y = c_1 E_1 t + P_1 n$$

$$P_2 y = c_2 E_2 t + P_2 n$$

$$P_3 y = c_3 E_3 t + P_3 n,$$

where $c_0$, $c_1$, $c_2$, and $c_3$ are as defined above and based on the fact that $P_k E_k = E_k P_0$. Since the projectors sum to identity, the vectors above are sufficient statistics for y. Recall that $c=[c_0, c_1, c_2, c_3]^T \sim \mathcal{N}_{\mathbb{C}}(0, I/2)$ and is independent of the noise.

The receiver may now carry out error correction on the projected vectors. To do so, the receiver applies a unitary correction operator $E_k$ to each projection $P_k y$ and obtains:

$$z_0 = c_0 t + n$$

$$z_1 = c_1 t + E_1 P_1 n$$

$$z_2 = c_2 t + E_2 P_2 n$$

$$z_3 = c_3 t + E_3 P_3 n.$$

Since the $P_k$ are orthogonal projection operators, the projected and corrected noise vectors, $E_k P_k n$, are mutually independent. Following from this, the commutation relationships and unitarity of the correction operators imply that the resulting noise vectors are identically distributed with $E_k P_k n \sim \mathcal{N}_{\mathbb{C}}(0, \sigma_n^2 P_0)$ for all k. Since t=Cs, projections of the $z_k$ onto the column space of C are sufficient to estimate s. Letting $n_k = C^* E_k P_k n/(2\sqrt{2})$, and letting $\hat{c}_k = \sqrt{2c_k}$ the receiver computes:

$$q_k = \frac{C^* z_k}{2\sqrt{2}} = \hat{c}_k s + n_k, \text{ for } k \in \{0, 1, 2, 3\}.$$

In this example, the $n_k$ are independent and identically distributed with $n_k \sim \mathcal{N}_{\mathbb{C}}(0, \sigma_n^2 I/2)$. The scaled-identity covariance follows from the fact that $P_0 C = C$, since the columns of C are by definition in the code, and that $C^*C \propto I$.

The receive may now concatenate the $q_k$ into the vector $q=[q_0^T, q_1^T, q_2^T, q_3^T]^T$ and reformulate the maximum likelihood problem as:

$$\hat{s} = \arg \max_s f_{q|s}(q|s)$$

Given the transmit symbol s, q is a Gaussian random vector. Here, w may be defined as $w=[\hat{c}^T, n_0^T, n_1^T, n_2^T, n_3^T]^T$ so that $w \sim \mathcal{N}_{\mathbb{C}}(0, \Sigma)$, where $$\Sigma = \begin{bmatrix} I_4 & 0_{4 \times 8} \\ 0_{8 \times 4} & \frac{\sigma_n^2}{2} I_8 \end{bmatrix}.$$

Defining the matrix $M \in \mathbb{C}^{8 \times 12}$ via $$M = [(I_4 \otimes s)I_8]$$

yields $$q = Mw.$$

Thus, $q \cdot \mathcal{N}_\mathbb{C}(0, Q)$, where $Q = M\Sigma M^*$. It can be shown that $$Q = I_4 \otimes \left(ss^* + \frac{\sigma_n^2}{2}I_{2\times 2}\right).$$

It has been discovered that the second definition of Q may be useful in simplifying the likelihood function. Assuming that Q is invertible, the likelihood function can be written as $$f_{q|s}(q|s) = \frac{\exp(-q^*Q^{-1}q)}{\pi^8 \det(Q)}.$$

Using the property of determinants of Kronecker products yields $\det(Q) = \det$ $$\left(ss^* + \frac{\sigma_n^2}{2}I_{2\times 2}\right)^4.$$

Since, by assumption $s^*s = 1$, $$\det(Q) = \left[\left(1 + \frac{\sigma_n^2}{2}\right)\frac{\sigma_n^2}{2}\right]^4,$$

which is constant in s. Furthermore, using the Kronecker product definition, it is clear that $$Q^{-1} = I_{4 \times 4} \otimes \left(ss^* + \frac{\sigma_n^2}{2}I_{2\times 2}\right)^{-1}.$$

Designating $$U_s = \left(ss^* + \frac{\sigma_n^2}{2}I_{2\times 2}\right)^{-1}.$$

and calculating the inverse explicitly yields $$U_s = \frac{1}{\frac{\sigma_n^2}{2}\left(1 + \frac{\sigma_n^2}{2}\right)}\begin{bmatrix} |s_2|^2 + \frac{\sigma_n^2}{2} & -s_1 s_2^* \\ -s_2 s_1^* & |s_1|^2 + \frac{\sigma_n^2}{2} \end{bmatrix},$$

which, through substitution, yields an explicit decision rule, as follows:

$$\hat{s} = \arg\min_{s \in C} q^*(I_{4 \times 4} \otimes U_s)q.$$

This may be further simplified by noting that, since s is normalized, $$U_s \propto \frac{\sigma^2}{2}I_2 + (I_2 - ss^*).$$

Thus, the decision rule can be written as:

$$\hat{s} = \arg\max_{s \in C} \sum_{k=0}^{3} q_k^* ss^* q_k = \arg\max_{s \in C} s^* \sum_{k=0}^{3} (q_k q_k^*)s.$$

This form of the decoding rule lends itself to a quantum mechanical interpretation. For example, $\hat{q}_k \hat{q}_k^* = q_k q_k^*/\mathrm{tr}(q_k q_k^*)$ may be interpreted as normalized density operators. The mixed state, $\psi$, may be formed from drawing the states $\hat{q}_k \hat{q}_k^*$ with respective probabilities as follows:

$$p_k = \frac{tr(q_k q_k^*)}{\sum_{i=0}^{3} tr(q_i q_i^*)}.$$

This yields the density matrix:

$$\Psi = \frac{\sum_{i=0}^{3}(q_i q_i^*)}{\sum_{i=0}^{3} tr(q_i q_i^*)}$$

which is the same matrix that appears on the right-hand side of the decision rule shown above, up to a positive scale factor. Thus, using the definition of fidelity described earlier, it can be seen that the ML detection rule consists of finding the input state that maximizes the fidelity with respect to $\psi$, or, more explicitly, $$\hat{s} = \arg\max_{s \in C} F(\Psi, ss^*).$$

Note that maximizing the fidelity is the same as maximizing its square.

Figure 5:
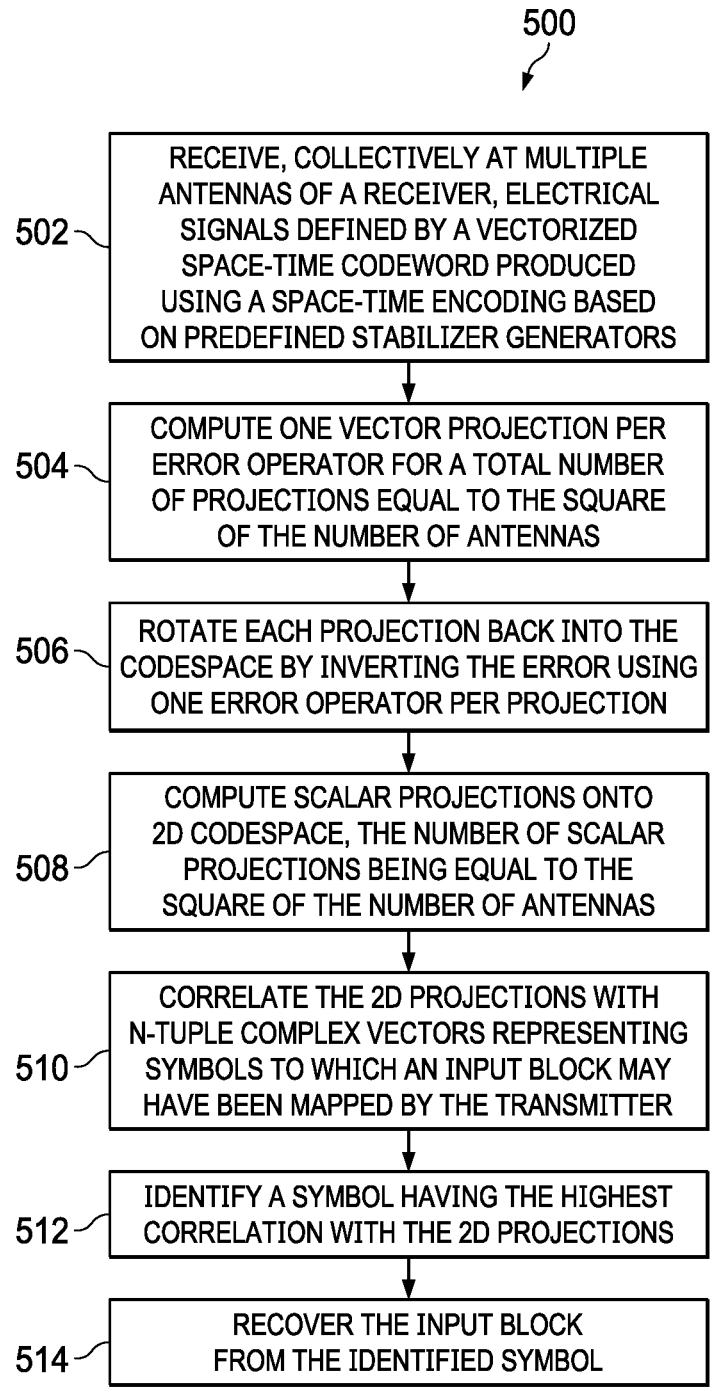
FIG. 5 illustrates selected elements of an example method for space-time decoding in flow diagram form, according to one embodiment.

An example method 500 for space-time decoding is illustrated by the flow diagram in FIG. 5, according to one embodiment. As shown at 502, the method may include receiving, collectively at multiple antennas of a receiver, electrical signals representing a transmitted input block and defined by a vectorized space-time codeword produced using a space-time encoding based on predefined stabilizer generators. More specifically, the m receiving antennas receive m different electrical signals at each time instant. The received signals are downconverted, after which signals received during a coherence interval, e.g., TC=2 m time instants, and then concatenated into a vector y such that the m signals received at a first time instant are followed by the m signals received at a second time instant, and so on up to the 2 $m^{th}$ time instant.

At 504, the method may include computing one vector projection per error operator for a total number of projections of y onto respective subspaces is equal to the square of the number of antennas, or $m^2$. For example, the projectors may be computed as elements of a projection matrix of the form:

$$P_l = 2^{-2k}\Pi_{q=0}^{2k-1}(I_{2^{2k+1}} + S_q(-1))^{\ell_{2k-1-q}})$$

which defines a projection onto a 2D subspace. The resulting projections may be defined as $\hat{\wp}_i = P_i y$. Note that C is a matrix whose columns are a basis for the range, or column space, of $P_0$, where $C \in \mathbb{C}^{2m^2+2}$.

Figure 6A:
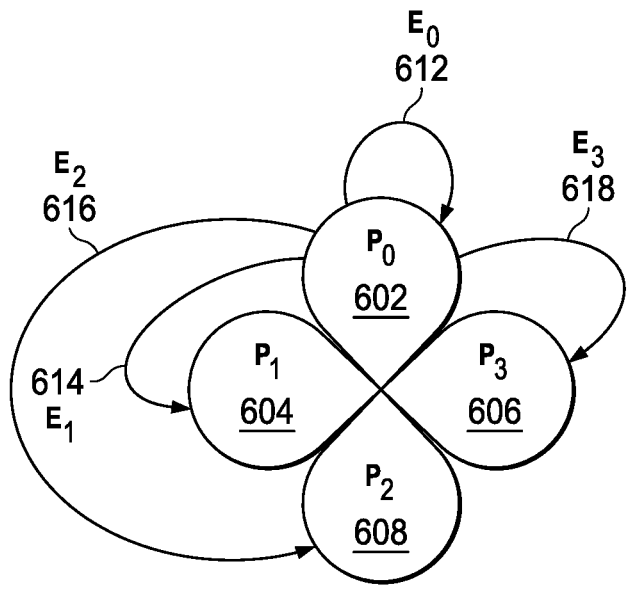
FIGS. 6A and 6B illustrate an example application of a projection matrix and error operators, in accordance with some embodiments.
Figure 6B:
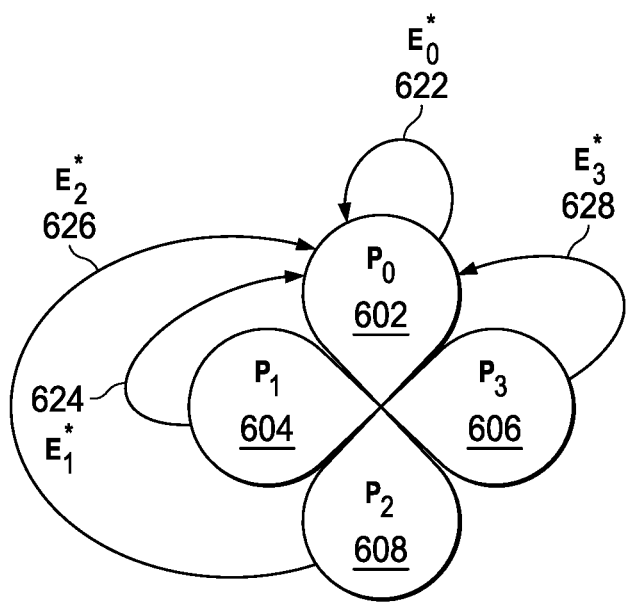

At 506, method 500 may include rotating each projection back into the codespace by inverting the error using one error operator per projection. The result may be defined as $\tilde{\wp}_i = E_i \hat{\wp}_i$. Examples of the projections and rotations described herein are illustrated in FIGS. 6A and 6B and described below.

At 508, method 500 may include computing scalar projections onto 2D codespace, where the number of scalar projections is equal to the square of the number of antennas, or $m^2$.

At 510, the method may include correlating the 2D projections with n-tuple complex vectors representing symbols to which an input block may have been mapped by the transmitter. For example, the correlations of $\tilde{\wp}_i$ with codewords may be computed via $w_i = C^* \tilde{\wp}_i$.

At 512, method 500 may include identifying a symbol having the highest correlation with the 2D projections, by computing the following:

$$\hat{s} = \underset{s \in C}{\mathrm{argmax}} \sum_{k=0}^{m^2-1} s^* w_i w_i^* s.$$

This produces a symbol chosen from the set of possible input symbols that is the maximum likelihood estimate for the symbol produced at the transmitter.

At 514, the method may include recovering the input block from the identified symbol. The input block may be recovered from the set of $2^q$ symbols in the constellation used by the symbol mapper of the transmitter, where q is the number of bits in each input block, and there is a 1-to-1 mapping between possible input blocks and available symbols, as described above.

For the projection matrices described herein, $P_0$ is a projector onto the intersection of the +1 eigenspaces of both of the generators, $S_0$ and $S_1$, $P_1$ is a projector onto the intersection of the +1 eigenspace of $S_0$ and the −1 eigenspace of $S_1$, $P_2$ is the converse, and $P_3$ is the projection onto the intersection of the −1 eigenspaces of both of the generators.

The equations below illustrate what happens when the vectorized received signal $\overline{H}t$ is multiplied by one of the projectors. Each projector, $P_i$, annihilates all of the terms except the one involving error i. This is because the labeling has been chosen carefully. Thus, if the received signal is further pre-multiplied by the inverse of the error operator, which is its Hermitian conjugate, the space-time codeword may be recovered up to a random complex (Gaussian) constant.

$$P_i \overline{H}t = c_i E_i t$$

$$E_i^* P_i \overline{H}t = c_i t$$

FIGS. 6A and 6B illustrate an example application of a projection matrix and error operators, in accordance with some embodiments. In these figures, each of the bulbs represents a subspace of the codespace C(S). Due to the stabilizer formalism, these subspaces are orthogonal. Each error operator, $E_i$, either rotates the codespace into one of the three other subspaces or does not do anything at all. These subspaces may be referred to as "error subspaces." In general, the received signal has energy in all the subspaces, since the channel is a linear combination of all of the error operators. Multiplying the received signal by one of those subspace projectors eliminates all of the signal energy outside of the particular subspace. Further multiplication by the error operator rotates that subspace back into the codespace.

FIGS. 6A and 6B illustrate example visualizations of the mappings between error operators and subspaces described by projection operators. More specifically, FIG. 6A illustrates the application of each error operator, $E_i$ to a particular subspace, which is defined by the projector $P_0$ (602). For example, $E_1$ (614) rotates the subspace defined by $P_0$ (602) to the subspace defined by $P_1$ (604), $E_2$ (616) rotates the subspace defined by $P_0$ (602) to the subspace defined by $P_2$ (608), and $E_3$ (618) rotates the subspace defined by $P_0$ (602) to the subspace defined by $P_3$ (606), but $E_0$ (612) has no effect on the subspace defined by $P_0$ (602).

FIG. 6B illustrates the application of the inversion of each error operator, which is its Hermitian conjugate, to particular subspaces. For example, $E_1^*$ (624) rotates the subspace defined by $P_1$ (604) back to the subspace defined by $P_0$ (602), $E_2^*$ (626) rotates the subspace defined by $P_2$ (608) back to the subspace defined by $P_0$, (602), and $E_3^*$ (628) rotates the subspace defined by $P_3$ (606) back to the subspace defined by $P_0$ (602), but $E_0^*$ (622) has no effect.

In the example wireless communication system described above, after the projection and "error correction" steps, there will be four vectors, each of which should be proportional (up to a Gaussian scalar) to the transmitted space-time codeword. In reality, there will also be additive noise. In at least some embodiments, the correlation techniques described above in reference to FIG. 5 may be used to estimate the transmitted symbol based on the recovered codewords.

Numerical simulations have been carried out to demonstrate the performance of the noncoherent space-time code presented herein. These simulations included Grassmannian line packings of size N=4 and N=8 in $\mathbb{C}^2$ with a Rayleigh fading environment.

The simulations compared the stabilizer-based, noncoherent space-time code constructions described herein with a coherent scheme based on the Alamouti code (for 2×2 systems) at spectral efficiency rates of r=1/2 and r=1 bits/channel use. Channel estimation was first performed by transmitting the symbols $[1,1]^T/\sqrt{2}$ and $[1,-1]^T/\sqrt{2}$ solving for an estimate of H at the receiver. Subsequently, the Alamouti scheme was used to transmit one space-time symbol $s \in \mathbb{C}^2$ over the remaining two channel uses in the coherence interval. Encoded in s were two binary phase-shift keying (BPSK) symbols for the rate r=½ approach and two quadrature phase-shift keying (QPSK) symbols for the rate r=1 approach.

Similarly, the simulations compared the stabilizer-based, noncoherent space-time code constructions described herein with an approach using differential unitary group codes. At both r=½ and r=1, the first two channel uses were used for the 2×2 reference matrix, and no information was transmitted. With the next two channel uses, a single differentially encoded 2×2 matrix drawn from an appropriately sized constellation was transmitted. For r=½, this constellation is a group code over the QPSK constellation; specifically, encoding over the 2×2 Pauli group elements. For r=1, this constellation is a dicylic group code generated over 16-PSK. The transmit symbols in both sets of comparisons were appropriately normalized so that the transmit power was constant over the four transmissions.

Figure 7:
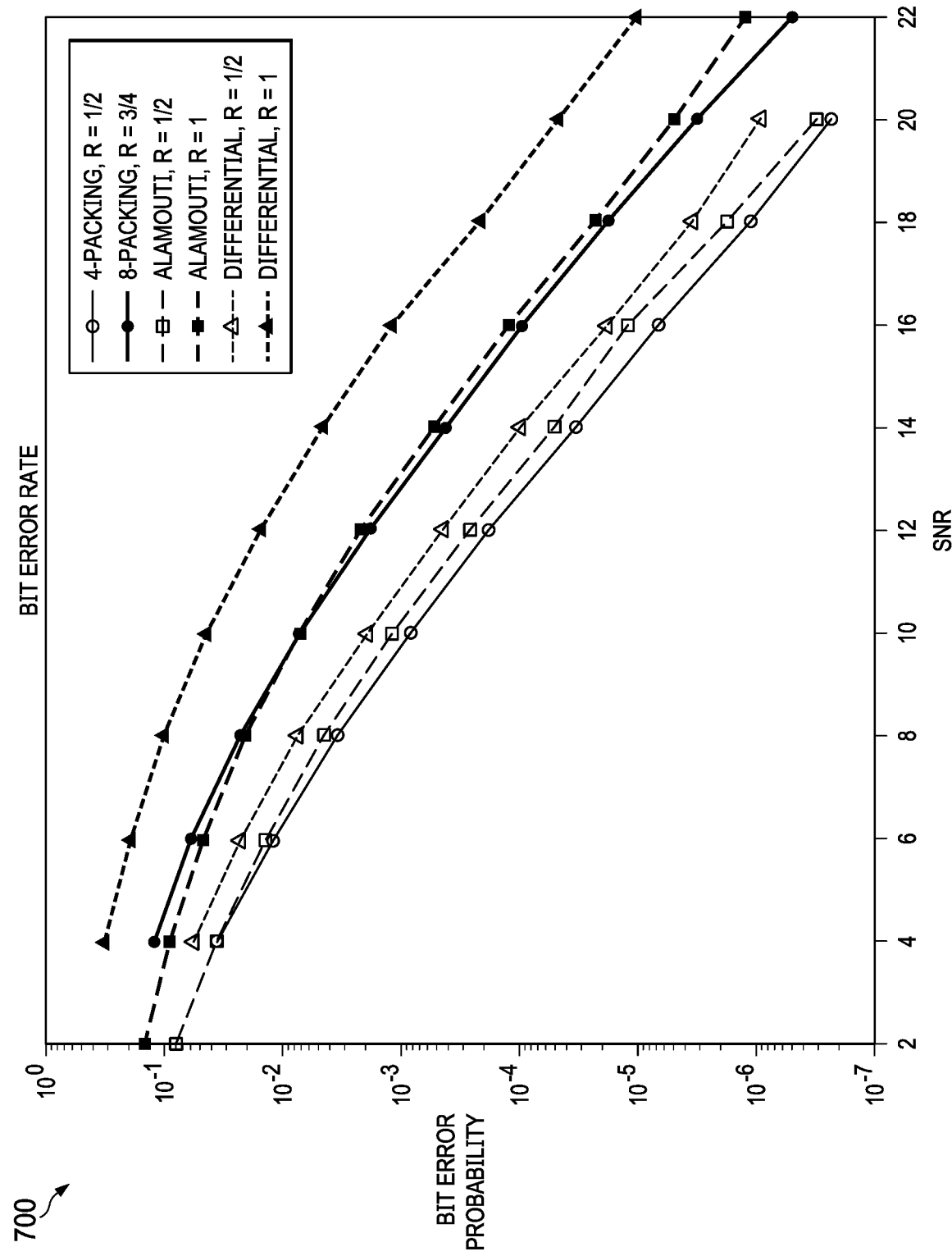
FIG. 7 illustrates a graph plotting bit error probability vs. SNR for the disclosed space-time encoding techniques as well as other encoding techniques.

Graph 700 in FIG. 7 plots bit error probability vs. SNR for the disclosed space-time encoding techniques as well as other encoding techniques. More specifically, the disclosed space-time encoding techniques were applied to a noncoherent MIMO channel of a 2×2 antenna system with T=4, m1=m2=2, where symbols were drawn from Grassmannian line packings (with 4 and 8 symbols). The disclosed space-time codes were compared to two other codes with approximately the same data rates, including the Alamouti coherent space-time code described above and the differential noncoherent code described above. Using an exact comparison for a rate 1/2 code, the disclosed space-time codes outperformed the Alamouti coherent space-time code slightly, and significantly outperformed the differential code. At other rates, such as a rate 3/4 code and a rate 1 code, results were mixed, with the disclosed space-time codes significantly outperforming a rate 1 differential code, and slightly outperforming an Alamouti code at rate 1.

A useful bound on the probability of symbol error has been computed as described below. In computing the bound, it was assumed that a particular symbol $s_0$ was transmitted. The approach included considering whether a sufficient statistic for estimating s (e.g., the sum of outer products of rotated projections) is closer to $s_1$, is closer to $s_2$, or is closer to $s_3$. This is the probability of a symbol error given that $s_0$ was transmitted:

$$s_0 \to s_i = F(s_0, \hat{Q}) \leq F(s_i, \hat{Q})$$

A typical wireless approach of using a union bound over those events is shown below as:

$$P_{e|0} = \mathbb{P}(U_{i \neq 0} s_0 \to s_i 0), \text{ where}$$

$$\mathbb{P}(U_{i \neq 0} s_0 \to s_i 0) \leq \Sigma_{i=0} \mathbb{P}(s_0 \to s_i 0).$$

The union bound may then be relaxed by replacing each term $s_0 \to s_i$ with the maximum of those terms, as follows:

$$P_e|0 \leq (|C|-1) \max_i \mathbb{P}(s_0 \to s_i 0).$$

Assuming all input symbols are equally likely to be transmitted, the probability of error may be bound by maximizing the aforementioned (and analogous) bounds over all possible input symbols, as follows:

$$P_e \leq \max_\ell P_{e|\ell} \leq (|C|-1) \max_i \mathbb{P}(S_\ell \to S_i \ell).$$

All that is needed for this bound is the maximum pairwise error probability, shown as the last term in the equation above. It has been discovered that all of the pairwise error probabilities are easy to bound using the Chernoff bound, which is a geometric bound on the cumulative distribution function of sums of independent and identically distributed random variables. The bound on the probability of symbol error thus becomes:

$$P_e \leq (|C|-1)\left(1 - \frac{1-|\hat{\delta}|^2}{\left(\frac{1}{SNR}\right)^2 + \frac{2}{SNR} + (1-|\hat{\delta}|^2)}\right) N_{ant}^2,$$

where $P_e \to 0$ as $SNR \to \infty$. In other words, the error probability goes to 0 as the SNR goes to infinity. Furthermore, the bound depends on the norm of $\hat{\delta}$, shown below:

$$|\hat{\delta}|^2 = \max_{\substack{s_m, s_n \in C \\ m \neq n}} |s_m^* s_n|^2$$

$$(|\hat{\delta}|^2 \in [0, 1])$$

This essentially represents the maximum absolute correlation between elements of the qubit symbol constellation, which increases with increasing correlation. Thus, the choice of a Grassmannian line packing minimizes an upper bound on the probability of error.

Figure 8A:
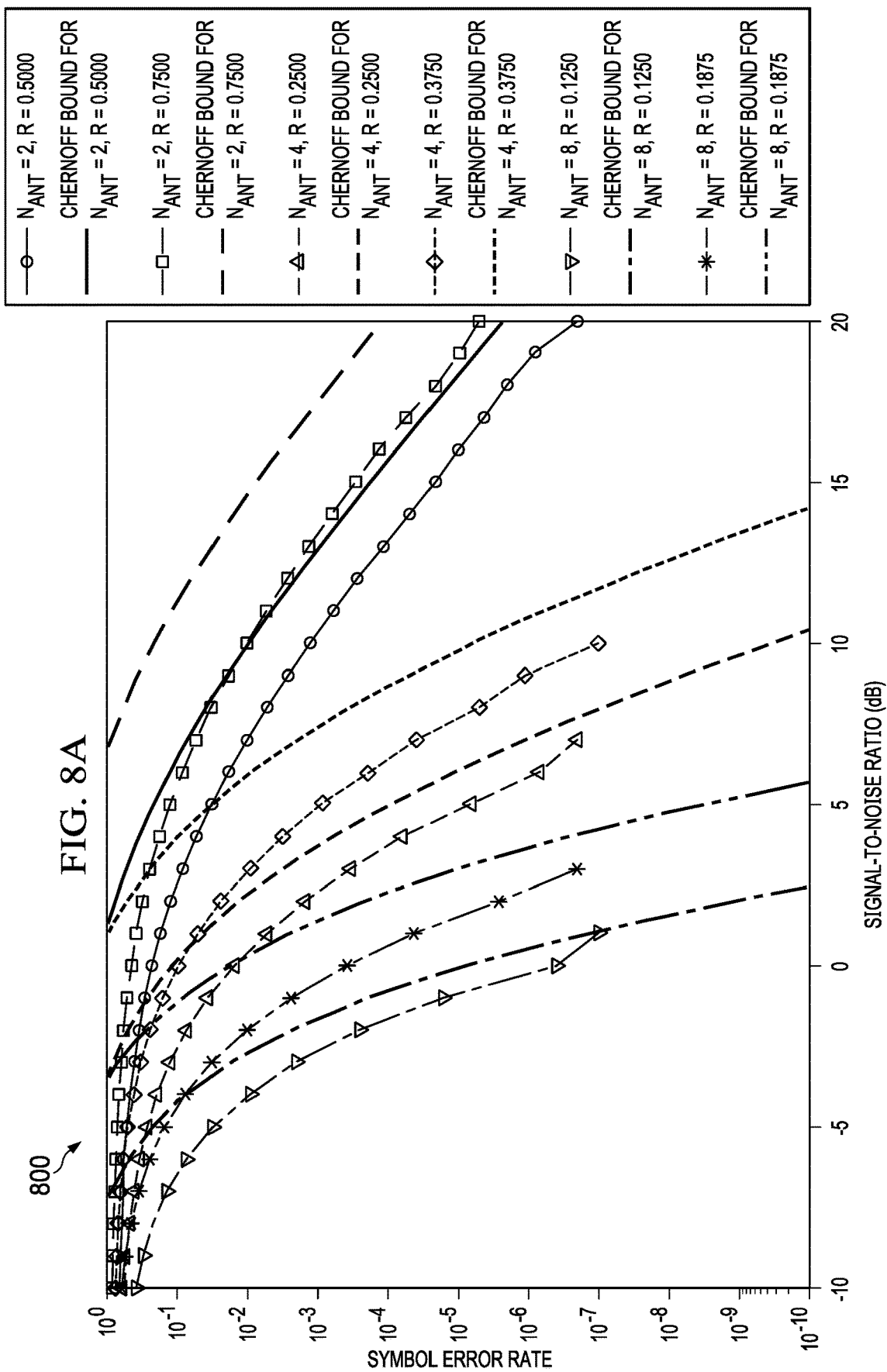
FIGS. 8A and 8B illustrate results of simulations in which the error probability is bounded, according to some embodiments.
Figure 8B:
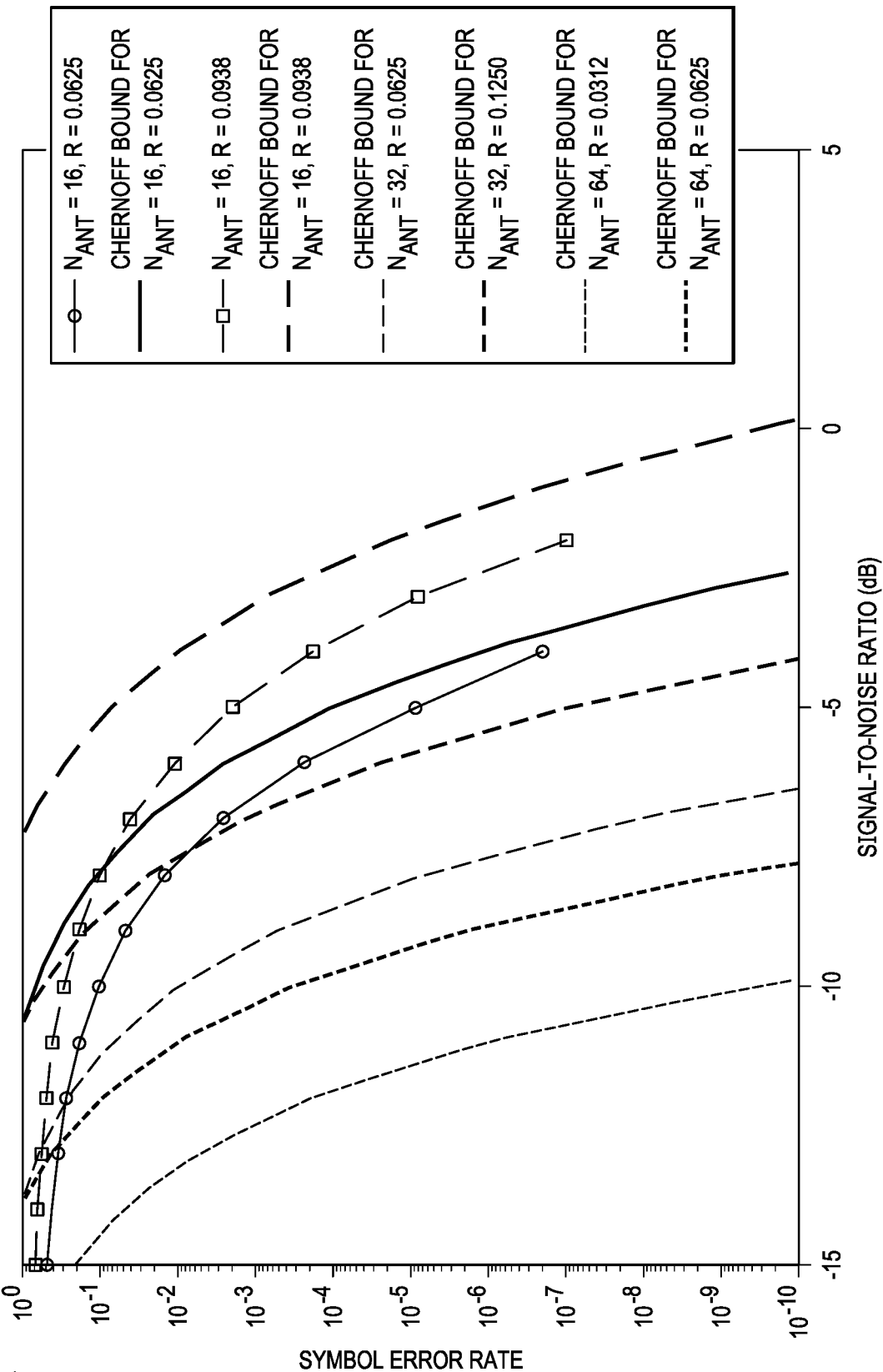

Results of simulations shown in FIGS. 8A and 8B illustrate that the expected bound is, in fact, a bound. For example, graph 800 in FIG. 8A plots signal-to-noise ratio (SNR) vs. symbol error rate for transmitters/receivers with different numbers of antennas (in this case, 2, 4, and 8 antennas) with different data rates, with and without bounding. Similarly, graph 801 in FIG. 8B plots SNR vs. symbol error rate for transmitters/receivers with different numbers of antennas (in this case, 16, 32, and 64 antennas) with different data rates, with and without bounding.

While several examples of noncoherent space-time encoding are described herein in terms of wireless communication systems that include a transmitter with two antennas and a receiver with two antennas, in other embodiments, the disclosed techniques may be applied in systems that include more than two antennas at the transmitter and/or at the receiver, or different numbers of transmitters at the transmitter than at the receiver. In some embodiments, these techniques may be extended to "square" antenna configurations with a dyadic number of antennas (i.e. $N_{ant} = N_{TX} = N_{RX} = 2^k$). In such embodiments, the number of error operators would be $(N_{ant})^2$ and the number of stabilizer generators would be $4^k$.

In general, a space-time block code model with N transmitter antennas, M receiver antennas, and an integer coherence length T may have the form $$Y = HX.$$

where $$\begin{pmatrix} Y_{1,1} & \cdots & Y_{1,T} \\ \vdots & \ddots & \vdots \\ Y_{M,1} & \cdots & Y_{M,T} \end{pmatrix} = \begin{pmatrix} H_{1,1} & \cdots & H_{1,N} \\ \vdots & \ddots & \vdots \\ H_{M,1} & \cdots & H_{M,N} \end{pmatrix} \begin{pmatrix} X_{1,1} & \cdots & Y_{1,T} \\ \vdots & \ddots & \vdots \\ X_{N,1} & \cdots & Y_{N,T} \end{pmatrix}.$$

This expression may be vectorized by stacking the columns of Y and X, resulting in:

$$\begin{bmatrix} \begin{pmatrix} Y_{1,1} \\ \vdots \\ Y_{1,T} \end{pmatrix} \\ \vdots \\ \begin{pmatrix} Y_{M,1} \\ \vdots \\ Y_{M,T} \end{pmatrix} \end{bmatrix} = \begin{bmatrix} H & 0 & \cdots & 0 \\ 0 & H & 0 & \cdots \\ \vdots & & \ddots & \vdots \\ 0 & \cdots & 0 & H \end{bmatrix} \begin{bmatrix} \begin{pmatrix} X_{1,1} \\ \vdots \\ X_{1,T} \end{pmatrix} \\ \vdots \\ \begin{pmatrix} X_{N,1} \\ \vdots \\ X_{N,T} \end{pmatrix} \end{bmatrix},$$

which may be written more compactly as $$y = (I_T \otimes H)x.$$

Note that H can be decomposed as a superposition of matrices $B_0$, $B_{MN-1}$ that form an orthonormal basis with respect to the Hilbert-Schmidt inner product, so that $$H = \sum_{i=0}^{MN-1} h_i B_i$$

where $h_i$ are complex random variables assumed to be such that $$E[h_i h_j^*] = \delta_{ij}$$

and $$Tr[B_i^* B_j] = \delta_{ij}.$$

Therefore, this classical channel may be construed as a quantum channel that transforms a pure state $xx^*$ into the mixed state $\rho = E[yy^* | x]$, since $$\begin{aligned}\rho &= E[(I_T \otimes H)xx^*(I_T \otimes H)^* | x] \\ &= \sum_{i,j} E[h_i h_j^* | x](I_T \otimes B_i)xx^*(I_T \otimes B_j^*) \\ &= \sum_{i=0}^{MN-1} (I_T \otimes B_i)xx^*(I_T \otimes B_i)^* \\ &= \sum_{i=0}^{MN-1} E_i xx^* E_i^*\end{aligned}$$

where $$E_i = I_T \otimes B_i$$

are the MT×NT Kraus error matrices.

It may be supposed that the errors are invertible in the sense that there exists an MT×NT left inverse $F_i$ such that $$F_i E_i = I_{NT}.$$

In the special case in which $B_i$ is a member of the Pauli group, $F_i = E^*$. More generally, if $B_i$ has linearly independent columns (and hence $B^* B_i$ is invertible), then $F_i = (E^* E_i)^{-1} E^*$, the pseudoinverse of $E_i$. It may be further supposed that the errors are orthogonal in the sense that $$F_i E_i = \delta_{ij} I_{NT}.$$

For encoding and error recovery, x may be considered an encoding of a symbol $s \in C^d$, where $d \geq 2$ and s is such that $\|s\|=1$. Hence, $ss^*$ may be construed as a pure quantum state. The transmitted vector x may be obtained from s via application of a NT×d encoding matrix C such that $$x = Cs.$$

It may be supposed that C is such that application of $C^*$ to x recovers s. In other words, $$C^* C = I_d.$$

Given the code matrix C and an error matrix $E_j$, a projection matrix $P_j$ onto the error subspace may be constructed as follows:

$$P_j = E_j C C^* F_j$$

Here, each $P_j$ is indeed a projection matrix, since $$\begin{aligned}P_j^2 &= E_j C C^* (F_j E_j) C C^* F_j \\ &= E_j C (C^* C) C^* F_j \\ &= E_j C C^* F_j \\ &= P_j.\end{aligned}$$

Here, note that the projection matrix leaves the corresponding error subspace invariant. Specifically, $$P_j E_i C = \delta_{ij} E_j C,$$

since $$P_j E_i C = E_j C C^* F_j E_i C = E_j C C^* (\delta_{ij} I_{NT}) C = \delta_{ij} E_j C.$$

An error recovery process may now be defined as follows. Given y, apply $C^* F_j P_j$ to yield $$\begin{aligned}C^* F_j P_j y &= C^* F_j P_j \left( \sum_{i=0}^{MN-1} h_i E_i \right) Cs \\ &= \sum_{i=0}^{MN-1} h_i C^* F_j P_j E_i Cs \\ &= h_j C^* F_j E_j Cs \\ &= h_j s.\end{aligned}$$

Each projection of y yields a scalar multiple of s. Assuming these are not all zero (which is true almost surely), the value of s may be recovered uniquely. Note that this procedure is only valid for $d \geq 2$. In particular, it would not work for QAM symbols (for which d=1).

In one example, N=1, M=2, and T=2. Let $B_0 = [1\ 0]^T$ and $B_1 = [0\ 1]^T$, so $H = [h_0 h_1]^T$. The error matrices are, then, $$E_0 = \begin{bmatrix} 1 & 0 \\ 0 & 0 \\ 0 & 1 \\ 0 & 0 \end{bmatrix}, E_1 = \begin{bmatrix} 0 & 0 \\ 1 & 0 \\ 0 & 0 \\ 0 & 1 \end{bmatrix}$$

and their left inverses are $F_0 = E_0^T$ and $F_1 = E_1^T$. Note that $F_i E_j = \delta_{ij} I_2$. In particular, take d=2 and define $C = I_2$ (repetition code). Then $P_j = E_j F_j$.

Figure 9:
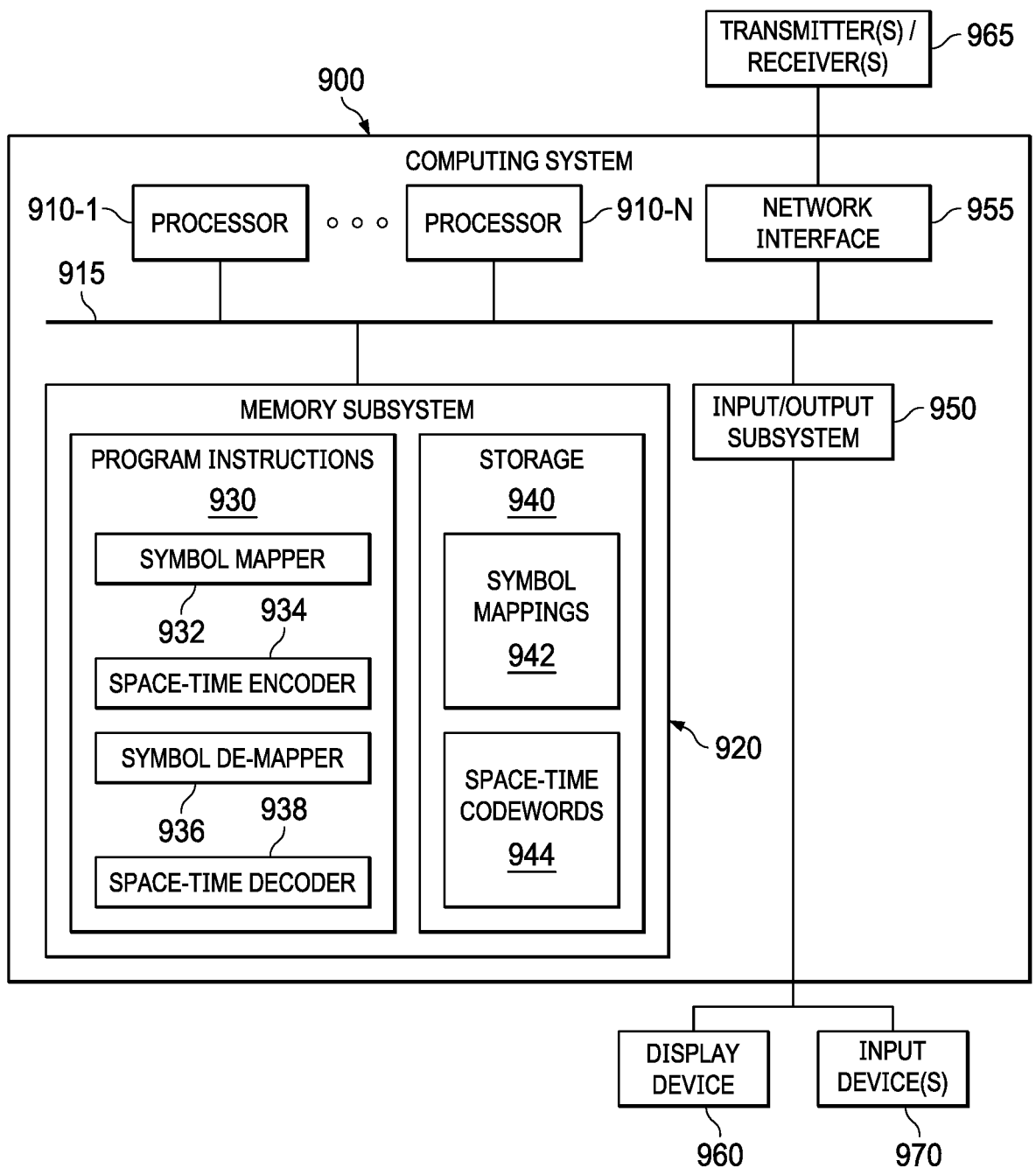
FIG. 9 illustrates an example computing system for space-time encoding in a wireless communication system, according to one embodiment.

FIG. 9 illustrates an example computing system 900 for space-time encoding in a wireless communication system, according to one embodiment. In some embodiments, computing system 900 may be, or may be a component of, a transmitter or receiver in a wireless communication system. In other embodiments, computing system 900 may be a stand-alone system that provides information to a transmitter or receiver to configure it for space-time encoding and/or decoding. In this example embodiment, computing system 900 includes one or more processors 910. Each of processors 910 may include circuitry or logic to interpret or execute program instructions and/or to process data. For example, each processor 910 may include a microprocessor, microcontroller, digital signal processor (DSP), graphics processor, field-programmable gate array (FPGA), or application specific integrated circuit (ASIC). In some embodiments, processors 910 may interpret and/or execute program instructions and/or process data stored locally in memory subsystem 920 or remotely (not shown).

Processors 910 may implement any instruction set architecture (ISA), in different embodiments. In some embodiments, all of the processors 910 may implement the same ISA. In other embodiments, two or more of processors 910 may implement different ISAs. Processors 910 are coupled to a memory subsystem 920, a network interface 955, and an input/output subsystem 950 via a system interface 915. System interface 915 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express bus, or a HyperTransport (HT) bus.

In some embodiments, memory subsystem 920 may include random access memory (RAM), read-only memory (ROM), electrically erasable programmable read-only memory (EEPROM), flash memory, magnetic storage, opto-magnetic storage, and/or any other type of volatile or non-volatile memory. In some embodiments, memory subsystem 920 may include computer-readable media, e.g., a hard disk drive, floppy disk drive, CD-ROM, and/or other type of rotating storage media, and/or another type of solid-state storage media. In the example embodiment illustrated in FIG. 9, memory subsystem 920 includes program instructions 930, including program instructions that when executed by one or more of the processors 910 may implement all or a portion of one or more of the methods described herein for space-time encoding in a wireless communication system, such as method 300 illustrated in FIG. 3, method 400 illustrated in FIG. 4, and/or method 500 illustrated in FIG. 5. For example, program instructions 930 include symbol mapper 932, space-time encoder 934, symbol de-mapper 936, and/or space-time decoder 938. In some embodiments, these components may implement functionality of a transmitter and/or a receiver in a wireless communication system, such as those described herein. In the example embodiment illustrated in FIG. 9, storage 940 includes storage for symbol mappings (shown as 942) and/or storage for space-time codewords (shown as 944). Storage 940 may also store other data used in performing the methods described herein, such as definitions of stabilizer generators or corresponding algebraic groups, definitions of projection matrices, Pauli group matrices, error operators, or characteristics of a transmitter or receiver, including the number of transmitting or receiving antennas (not shown in FIG. 9). Storage 940 may also store data used in implementing functionality of computing system 900 other than space-time encoding.

In the example embodiment illustrated in FIG. 9, input/output subsystem 950 may implement any of a variety of digital and/or analog communication interfaces, graphics interfaces, video interfaces, user input interfaces, and/or peripheral interfaces for communicatively coupling input/output devices or other remote devices to the components of computing system 900. Input/output subsystem 950 may generate signals to be provided to one or more input devices 970. Input/output subsystem 950 may also generate signals to be provided to a display device 960. For example, display device 960 may receive signals encoding data for display of a graphical user interface (GUI) or command line interface for interacting with various components of a computing system 900 to initiate the performance of method 300 illustrated in FIG. 3, method 400 illustrated in FIG. 4, or method 500 illustrated in FIG. 5, or to display results.

In the example embodiment illustrated in FIG. 9, network interface 955 may implement any of a variety of digital and/or analog network interfaces, in accordance with any suitable network protocols, to allow computing system 900 to interact with various transmitters and/or receivers 965. Alternatively, computing system 900 may interact with transmitters and/or receivers 965 using a digital and/or analog communication interface implemented by input/output subsystem 950. For example, computing system 900 may, after generating symbol mappings 942 or space-time codewords 944, provide the symbol mappings 942 or space-time codewords 944 to a transmitter 965 via network interface 955 or input/output subsystem 950 to configure the transmitter to perform space-time encoding when transmitting information in a wireless communication system, as described herein. Similarly, computing system 900 may provide symbol mappings, definitions of projection matrices, or error operators to a receiver 965 to configure the receiver to perform space-time decoding when receiving transmitted information that was encoded using space-time encoding, as described herein.

As noted above, in some embodiments, computing system 900 may be, or may be a component of, a transmitter or receiver in a wireless communication system. In some such embodiments, computing system 900 may include circuitry to collectively transmit, by a plurality of antennas of the transmitter to a plurality of antennas of a receiver over a wireless transmission channel, electrical signals defined by the vectorized space-time codewords described herein (not shown in FIG. 9). In some such embodiments, computing system 900 may include circuitry to collectively receive, by a plurality of antennas of the receiver from a plurality of antennas of a transmitter over a wireless transmission channel, electrical signals defined by the vectorized space-time codewords described herein (not shown in FIG. 9).

Although only exemplary embodiments of the present disclosure are specifically described above, it will be appreciated that modifications and variations of these examples are possible without departing from the spirit and intended scope of the disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by the law, the scope of the present disclosure is to be determined by the broadest permissible interpretation of the following claims and their equivalents and shall not be restricted or limited by the foregoing detailed description.

What is claimed is:

1. A transmitter for wireless communication, comprising:
   a first plurality of antennas; and
   circuitry configured to:
   convert an input block of an incoming binary bit stream representing information to be transmitted, into a vectorized space-time codeword defining electrical signals to be transmitted by the transmitter, using an encoding operator that is dependent on a plurality of stabilizer generators, the input block comprising a plurality of binary bits; and
   transmit, via the first plurality of antennas to a second plurality of antennas of a receiver over a wireless channel, the electrical signals defined by the vectorized space-time codeword.

2. The transmitter of claim 1, wherein the wireless channel comprises a noncoherent multiple-input multiple-output (MIMO) channel that has coherence over a time period.

3. The transmitter of claim 1, wherein:
   a number of antennas in the first plurality of antennas is same as a number of antennas in the second plurality of antennas; or
   the number of antennas in the first plurality of antennas is different from the number of antennas in the second plurality of antennas.

4. The transmitter of claim 1, wherein at least one of: a number of antennas of the first plurality of antennas or a number of antennas of the second plurality of antennas, is:
   each equal to a power of two, or
   each not equal to a power of two.

5. The transmitter of claim 1, wherein the circuitry is configured to convert the input block by:
  mapping the input block to a symbol representing an ordered plurality of numbers; and
  applying the encoding operator to the symbol to produce the vectorized space-time codeword.

6. The transmitter of claim 1, wherein each of the plurality of stabilizer generators has an index value that ranges from 0 to one less than twice a base-two logarithm of a number of antennas in the first plurality of antennas.

7. A method for wireless communication, comprising:
  converting, at a transmitter, an input block of an incoming binary bit stream representing information to be transmitted, into a vectorized space-time codeword defining electrical signals to be transmitted by the transmitter, using an encoding operator that is dependent on a plurality of stabilizer generators, the input block comprising a plurality of binary bits; and
  transmitting, by a first plurality of antennas of the transmitter to a second plurality of antennas of a receiver over a wireless channel, the electrical signals defined by the vectorized space-time codeword.

8. The method of claim 7, wherein the wireless channel comprises a noncoherent multiple-input multiple-output (MIMO) channel that has coherence over a time period.

9. The method of claim 7, wherein:
  a number of antennas in the first plurality of antennas is same as a number of antennas in the second plurality of antennas; or
  the number of antennas in the first plurality of antennas is different from the number of antennas in the second plurality of antennas.

10. The method of claim 7, wherein at least one of: a number of antennas of the first plurality of antennas or a number of antennas of the second plurality of antennas, is:
  each equal to a power of two, or
  each not equal to a power of two.

11. The method of claim 7, wherein converting the input block comprises:
  mapping the input block to a symbol representing an ordered plurality of numbers; and
  applying the encoding operator to the symbol to produce the vectorized space-time codeword.

12. The method of claim 7, wherein each of the plurality of stabilizer generators has an index value that ranges from 0 to one less than twice a base-two logarithm of a number of antennas in the first plurality of antennas.

13. A receiver comprising:
  a first plurality of antennas configured to receive, over a wireless channel from a second plurality of antennas of a transmitter, electrical signals defined by a vectorized space-time codeword; and
  circuitry configured to recover, from the received electrical signals, an input block comprising a plurality of binary bits, wherein the vectorized space-time codeword is formed from the input block using an encoding operator that is dependent on a plurality of stabilizer generators.

14. The receiver of claim 13, wherein the wireless channel comprises a noncoherent multiple-input multiple-output (MIMO) channel that has coherence over a predefined time period and additive Gaussian noise.

15. The receiver of claim 13, wherein:
  a number of antennas in the first plurality of antennas is same as a number of antennas in the second plurality of antennas; or
  the number of antennas in the first plurality of antennas is different from the number of antennas in the second plurality of antennas.

16. The receiver of claim 13, wherein at least one of: a number of antennas of the first plurality of antennas or a number of antennas of the second plurality of antennas, is:
  each equal to a power of two, or
  each not equal to a power of two.

17. The receiver of claim 13, wherein the circuitry is configured to recover the input block by:
  recovering a symbol from the electrical signals, the symbol representing an ordered plurality of numbers; and
  recovering the input block from the symbol.

18. The receiver of claim 13, wherein each of the plurality of stabilizer generators has an index value that ranges from 0 to one less than twice a base-two logarithm of a number of antennas in the second plurality of antennas.

19. A method for wireless communication, comprising:
  receiving, by a first plurality of antennas of a receiver from a second plurality of antennas of a transmitter over a wireless channel, electrical signals defined by a vectorized space-time codeword; and
  recovering, from the received electrical signals, an input block comprising a plurality of binary bits, wherein the vectorized space-time codeword is formed from the input block using an encoding operator that is dependent on a plurality of stabilizer generators.

20. The method of claim 19, wherein:
  a number of antennas in the first plurality of antennas is same as a number of antennas in the second plurality of antennas; or
  the number of antennas in the first plurality of antennas is different from the number of antennas in the second plurality of antennas.

\* \* \* \* \*